(12) United States Patent
Tamura et al.

(10) Patent No.: US 7,505,392 B2
(45) Date of Patent: Mar. 17, 2009

(54) OPTICAL DISK WITH A PLURALITY OF RADIALLY EXTENDING MARKS FOR RECORDING REFLECTANCE DATA OF THE OPTICAL DISK

(75) Inventors: Reiji Tamura, Moriya (JP); Hiroshi Shirai, Moriya (JP)

(73) Assignee: Hitachi Maxell, Ltd., Osaka (JP)

( * ) Notice: Subject to any disclaimer, the term of this patent is extended or adjusted under 35 U.S.C. 154(b) by 778 days.

(21) Appl. No.: 10/988,707

(22) Filed: Nov. 16, 2004

(65) Prior Publication Data

US 2005/0105459 A1 May 19, 2005

(30) Foreign Application Priority Data

Nov. 18, 2003 (JP) .............................. 2003-387488
Aug. 11, 2004 (JP) .............................. 2004-234321

(51) Int. Cl.
    *G11B 7/24* (2006.01)
(52) U.S. Cl. ................................... 369/275.4; 428/64.1
(58) Field of Classification Search ........................ None
    See application file for complete search history.

(56) References Cited

U.S. PATENT DOCUMENTS

| | | | | |
|---|---|---|---|---|
| 6,496,459 | B2* | 12/2002 | Ueki ........................ | 369/47.53 |
| 7,362,691 | B2* | 4/2008 | Lee et al. .................. | 369/275.1 |
| 2005/0286360 | A1* | 12/2005 | Nakao ....................... | 369/44.41 |
| 2007/0275205 | A1* | 11/2007 | Ootera et al. .............. | 428/64.4 |
| 2007/0280095 | A1* | 12/2007 | Yoshida et al. ........... | 369/275.4 |

FOREIGN PATENT DOCUMENTS

| | | |
|---|---|---|
| CN | 1170929 A | 1/1998 |
| CN | 1280368 A | 1/2001 |
| CN | 1394332 A | 1/2003 |
| JP | A 61-258367 | 11/1986 |
| JP | A 62-16255 | 1/1987 |
| JP | A 62-209741 | 9/1987 |
| JP | A 02-156422 | 6/1990 |
| JP | A 03-116442 | 5/1991 |
| JP | B2 2512087 | 4/1996 |
| JP | A 2002-56576 | 2/2002 |
| JP | A 2002-367172 | 12/2002 |
| JP | A 2006-505887 | 2/2006 |
| WO | WO 2004/042711 A1 | 5/2004 |

OTHER PUBLICATIONS

Kubota et al., "Reduction of Cross-erase in Phase Change Media," Proceeding of SPIE, Optical Data Storage, Vo. 3401, pp. 103-111, May 10-13, 1998.

* cited by examiner

*Primary Examiner*—Tan X Dinh
(74) *Attorney, Agent, or Firm*—Oliff & Berridge, PLC

(57) ABSTRACT

An optical disk includes a first area on which user information is recorded, and a second area in which a plurality of marks radially extending are arranged in a track direction in the optical disk. Information about the reflectance of the optical disk is recorded in the second area. It is intended to optimize the amplification factor of the reproduced signal on the basis of the information about the reflectance of the optical disk in the second area. Control data and user data can be reproduced quickly and highly reliably without depending on the relationship between the reflectances of a recording area and a non-recorded area of the optical disk.

6 Claims, 7 Drawing Sheets

OPTICAL DISK WITH A PLURALITY OF RADIALLY EXTENDING MARKS FOR RECORDING REFLECTANCE DATA OF THE OPTICAL DISK

BACKGROUND OF THE INVENTION

1. Field of the Invention

The present invention relates to an optical disk, a method for producing the same, and a recording and reproducing apparatus. In particular, the present invention relates to an optical disk which stably reproduces information recorded on optical disks having different reflectances, a method for producing the same, and a recording and reproducing apparatus.

2. Description of the Related Art

DVD, which has appeared in recent years, has a lineup including, for example, not only information read-only DVD-ROM and DVD-Video but also information recordable DVD-R and information rewritable DVD-RAM and DVD-RW. Therefore, the DVD market is rapidly expanded not only as the screen image-recording and reproducing medium which substitutes VTR but also as the large capacity medium for computers. Recently, the digital broadcast has come into widespread use, which simultaneously increases the demand for any medium capable of responding to the high detailed image and the long time recording and the demand for any large capacity storage medium capable of responding to the digital data increasing day after day.

A variety of techniques have been hitherto suggested in the field of the optical disk in order to realize the high density. Those having been suggested include, for example, a method in which the recording mark is made fine and minute by using the blue laser having a shorter wavelength ($\lambda=405$ nm) and a method in which the high density is realized by recording information on both of the land and the groove of the optical disk. In view of the format, various optical disks have been also suggested, in which not only the data-recording section but also the header section structure to store, for example, the address information is contrived. For example, in the case of iD-photo, the guide groove is deflected in the radial direction of the track to record information about the header section on only one side of the recording track, and thus the format efficiency is enhanced without longly cutting the recording track.

The phase-change recording system, which is adopted, for example, for DVD-RAM and DVD-RW, is generally used in relation to the technique of the information rewritable optical disk. In the case of the optical disk based on the phase-change recording system, a phase-change material is used for a recording layer. Basically, pieces of information of "0" and "1" are recorded to correspond to the crystalline state (non-recorded state) and the amorphous state (recorded state) of the phase-change material respectively. The refractive index differs between areas in the crystalline state and the amorphous state formed in the recording layer. Therefore, for example, the refractive indexes and the thicknesses of the respective layers for constructing the optical disk are designed so that the difference in reflectance is maximized between the portion changed into the crystalline state and the portion changed into the amorphous state. In the case of the optical disk based on the phase-change recording system, the light beam is radiated onto the crystallized portion and the amorphous portion to detect the difference in the reflected light amount between the respective portions of the optical disk so that "0" and "1", which are recorded in the recording layer, are detected.

In order that the amorphous state is realized at a predetermined position of the recording layer of the optical disk based on the phase-change recording system (usually, this operation is referred to as "recording"), the light beam having a relatively high power is radiated so that the temperature of the irradiated portion of the recording layer is raised to a temperature which is not less than the melting point of the recording layer material. On the other hand, in order to effect the crystallization at a predetermined position of the recording layer (usually, this operation is referred to as "erasing"), the light beam having a relatively low power is radiated so that the temperature of the irradiated portion of the recording layer is raised to a temperature which is not more than the melting point of the recording layer material and which is in the vicinity of the crystallization temperature. As described above, in the case of the optical disk based on the phase-change recording system, the predetermined portion in the recording layer can be reversibly changed between the amorphous state and the crystalline state by regulating the radiation power of the light beam to be radiated onto the recording layer.

In the case of the conventional optical disk based on the phase-change recording system, it has been tried to improve the various characteristics of the optical disk by not only increasing the difference in the reflectance between the amorphous state and the crystalline state in the recording layer but also by adjusting the relationship of relative magnitude between the reflectances of the both states. For example, in the case of ordinary DVD-RAM and DVD-RW, the disk is designed so that the reflectance is high at the portion in the crystalline state corresponding to the non-recorded state, and the reflectance is low at the portion in the amorphous state corresponding to the recorded state. Therefore, in the case of the optical disk as described above, the following advantage is obtained, because the address information is recorded in the area in the non-recorded state. That is, the address information is obtained at high S/N, and the reliability of the address information reproduction is improved. Further, in the case of the optical disk as described above, the following advantage is obtained, because the focus servo signal and the tracking servo signal are also obtained from the area in the non-recorded state. That is, it is possible to obtain the tracking servo signal and the focus servo signal having the sufficient intensities, and it is possible to perform, for example, the tracking control in a stable manner.

On the other hand, in relation to the technique of the write-once optical disk capable of recording information only once, a method is generally used, in which a recording layer is formed by using a material containing an organic dye as adopted, for example, for DVD-R. When information is recorded in the recording layer containing the organic dye, the recording mark is formed in the recording layer by causing, for example, at least one of the change of the optical parameter of the organic dye in the recording layer, the deformation of the recording layer as well as the reflective layer and the substrate disposed close to the recording layer, and the gap generated in the recording layer or at the recording layer interface by radiating the light beam having a relatively high power. In the case of DVD-R, the setting is made such that the reflectance is high in the non-recorded state and the reflectance is low in the recorded state, in the same manner as in DVD-RAM and DVD-RW. Therefore, DVD-R is advantageous in that the address information is obtained at high S/N, and the reliability is improved when the address information is reproduced. Further, the focus servo signal and the tracking servo signal are also obtained from the area in the non-recorded state. Therefore, DVD-R is advantageous in that it is possible to obtain the tracking servo signal and the focus servo signal having the sufficient intensities, and it is possible to perform, for example, the control of the tracking in a stable manner.

In this specification, the optical disk, which has the following feature like the conventional DVD-RAM, DVD-RW, and DVD-R, is referred to as "High to Low" disk or simply "HL" disk. That is, when information is recorded by radiating the light beam, the reflectance of the portion irradiated with the light beam (portion in the recorded state) is changed from the high value (high level) to the low value (low level). In general, the HL disk based on the phase-change recording system has a structure including at least a protective layer composed of a transmissive dielectric, a phase-change recording layer, an intermediate layer composed of a transmissive dielectric, and a heat-diffusing layer composed of metal (having a function of a reflective layer as well) which are disposed in this order from the light beam incoming side. Further, the HL disk, which is based on the use of a recording layer containing an organic dye, generally has a structure including at least a recording layer containing an organic dye and a heat-diffusing layer composed of metal (having a function of a reflective layer as well) which are disposed in this order from the light beam incoming side.

In relation to the conventional optical disk based on the phase-change recording system, an optical disk has been also suggested, which is designed such that the reflectance is low in the area in the crystalline state corresponding to the non-recorded state in the recording layer of the optical disk, and the reflectance is high in the area in the amorphous state corresponding to the recorded state (see, for example, Japanese Patent No. 2512087, pp. 4-6, FIG. 1). The optical disk, which is disclosed in Japanese Patent No. 2512087, is advantageous in that old information is erased at a larger ratio when new information is overwritten on the old information.

On the other hand, the optical disk (hereinafter referred to as "organic dye type optical disk"), which is based on the use of the recording layer containing the organic dye, can be also designed such that the reflectance is low in the area in the non-recorded area, and the reflectance is high in the area corresponding to the recorded state. Specifically, the recording mark is formed by causing the change of the optical parameter of the organic dye in the recording layer, while extremely avoiding the deformation of the recording layer as well as the substrate and the reflective layer and the gap generated in the recording layer or at the recording layer interface when the recording mark is formed as described above. Accordingly, the reflectance can be made low in the area in the non-recorded state, and the reflectance can be made high in the area corresponding to the recorded state. The optical disk as described above is advantageous in that the recording sensitivity is improved, because the reflectance is low in the non-recorded area.

In this specification, the optical disk, which has the following feature like the optical disk disclosed in Japanese Patent No. 2512087, is referred to as "Low to High" disk or simply "LH" disk. That is, when information is recorded by radiating the light beam, the reflectance of the portion irradiated with the light beam (portion in the recorded state) is changed from the low value (low level) to the high value (high level). The LH disk, which is based on the phase-change recording system, has a structure as represented by multilayer films including, for example, a recording layer/dielectric layer, a recording layer/metal reflective layer, and a dielectric layer/recording layer/dielectric layer/metal reflective layer. The interference effect is utilized between the films for constructing the multilayer film. Accordingly, the reflectance is low in the area in the crystalline state corresponding to the non-recorded state, and the reflectance is high in the area in the amorphous state corresponding to the recorded state.

Conventionally, an LH disk based on the phase-change recording system has been also suggested (see, for example, Proc. SPIE, vol. 3401, p. 103, 1998), which has a multilayer film structure comprising $ZnS—SiO_2/SiO_2/ZnS—SiO_2/Ge_2Sb_2Te_5/ZnS—SiO_2/Al$ alloy. Also in the case of the LH disk, the interference effect is utilized between the films for constructing the multilayer film so that the reflectance is low in the area in the crystalline state corresponding to the non-recorded state, and the reflectance is high in the area in the amorphous state corresponding to the recorded state.

As described above, both of the HL disk and the LH disk have been hitherto investigated in the field of the optical disk based on the phase-change recording system and in the field of the organic dye type optical disk. When each of the optical disks is installed to a conventional recording and reproducing apparatus to record and reproduce information, the following problems arise due to the difference in the film structure. (1) The reflectance in the non-recorded state (crystalline state in the case of the phase-change type) differs between the HL disk and the LH disk. (2) The relationship between the reflectance in the non-recorded state and the average reflectance after the information recording differs between the HL disk and the LH disk. That is, the values of the reflectances in the areas in the non-recorded state and the recorded state and the relationship of relative magnitude therebetween differ depending on whether the optical disk is either the HL disk or the LH disk. Therefore, the level of the reproduced signal to be obtained differs as well. Therefore, a problem arises such that it is impossible to reproduce information stably and highly reliably from both of the HL disk and the LH disk by using any identical recording and reproducing apparatus.

For example, the following method may be conceived in order to solve the problem as described above. That is, any information, which indicates that the optical disk installed to the recording and reproducing apparatus is either the HL disk or the LH disk (hereinafter referred to as "type of the optical disk" as well), is recorded in a control data area for storing the physical format information about the optical disk. The gain is optimally adjusted on the basis of the information, and then the user information or the like is reproduced.

In general, the control data of the optical disk is formed by emboss pits. The control data area and the user data area are formed approximately adjacently to one another. Therefore, in the case of the optical disk based on the phase-change recording system and the optical disk of the organic dye type, for example, the phase-change film, the protective film, and the organic dye film are formed not only in the user data area but also in the control data area respectively. In the case of the conventional optical disks as described above, even when the information concerning the type of the optical disk is recorded in the control data area, the reflectance of the control data area is also changed depending on the type of the optical disk. Therefore, if the gain is not adjusted, it is impossible to accurately reproduce not only the control data but also the information concerning the type of the optical disk. Therefore, in the case of the optical disk on which the information concerning the type of the optical disk is recorded in the control data area, it is necessary that the information concerning the type of the optical disk and the control data are reproduced while adjusting the gain of the reproduced signal depending on the type of the optical disk. Therefore, a problem arises such that the gain adjustment requires a long period of time, and it is impossible to quickly reproduce the control data and the user data. However, at present, there is no method for solving this problem. It is also impossible to find any method for optimizing the gain depending on the type of the optical disk (HL disk or LH disk).

SUMMARY OF THE INVENTION

The present invention has been made in order to solve the problems involved in the conventional technique as described above, an object of which is to provide an optical disk and a recording and reproducing apparatus therefor wherein the control data and the user data can be reproduced quickly and highly reliably even when the optical disk is either the HL disk or the LH disk.

According to a first aspect of the present invention, there is provided an optical disk comprising a first area on which user information is recorded; and a second area in which a plurality of marks radially extending are arranged in a track direction in the optical disk; wherein information about a reflectance of the optical disk is recorded in the second area.

In the case of a general optical disk such as DVD, an area called "BCA" (Burst Cutting Area) is provided in an area disposed in the vicinity of the inner circumference of the optical disk. A plurality of marks, which extend in the radial directions of the optical disk, are arranged in the track direction in BCA (bar code-shaped mark group). Identification information about the disk, which includes, for example, the media ID of the optical disk and the version information, is recorded in the area. The bar code-shaped mark group is formed in the radial directions to have a length of, for example, about 1 mm. In the case of the optical disk of the present invention, the information about the reflectance of the optical disk is recorded in the area (second area) in which the bar code-shaped mark group such as BCA is formed. In the following description, the first area of the optical disk of the present invention is also referred to as "user data area", and the second area is also referred to as "bar code area".

In the optical disk of the present invention, it is preferable that the information about the reflectance of the optical disk is information which indicates a relationship between a reflectance in a non-recorded state and a reflectance in the recorded state in the first area. That is, it is preferable that the information, which expresses whether the optical disk is either the HL disk or the LH disk, is recorded in the bar code area of the optical disk of the present invention. Further, concrete values of the reflectances in the recorded state and the non-recorded state in the user data area of the optical disk may be recorded in the bar code area of the optical disk of the present invention.

The bar code-shaped mark group, which is formed in the bar code area of the optical disk of the present invention, is formed to have a sufficient length in the radial directions (for example, about 1 mm). Therefore, when the information in the bar code area is reproduced, the bar code information can be easily reproduced even when the position of the light beam in the radial direction is not strictly controlled. That is, the information in the bar code area can be reproduced by merely tracing the bar code area with the optical head without performing any strict tracking control. Therefore, the information about the reflectance of the optical disk, which is recorded in the bar code area, is easily obtained in a short period of time. The gain of the reproduced signal can be adjusted quickly and optimally on the basis of the information about the reflectance of the optical disk recorded in the bar code area. As a result, when the information is reproduced from the control data area and the user data area of the optical disk after the bar code area, it is unnecessary to adjust the gain depending on the type of the optical disk. The information can be quickly reproduced. Further, the optimum amplification factor for the reproduced signal is obtained before reproducing information from the control data area and the user data area. Therefore, the information about the control data area and the user data area and the servo signal for the tracking are obtained at sufficient amplitudes irrelevant to the type of the optical disk. It is possible to reproduce the information and control the tracking more reliably.

It is preferable for the optical disk of the present invention that a concentric or a spiral guide groove is formed in the first area, and address information is recorded by deflecting the guide groove in the radial direction of the optical disk.

It is preferable for the optical disk of the present invention that the user information is recorded on at least one of the guide groove and an area between the guide grooves, and the following relationship holds among a track pitch TP of the first area, a wavelength $\lambda$ of a light beam to be used for recording and reproducing information, and a numerical aperture NA of a light-collecting lens:

$$0.35 \times (\lambda/NA) \leq TP \leq 0.7 \times (\lambda/NA).$$

An effective method is available, in which the track pitch is narrowed in order to realize a large capacity of information. However, for example, in the case of the optical disk based on the phase-change recording system, when recording marks are recorded on an extremely narrow track, a phenomenon (so-called "cross erase") tends to occur extremely promptly such that a part of the mark recorded on the adjacent track is crystallized. In the case of the optical disk of the organic dye type, when recording marks are recorded on an extremely narrow track, a phenomenon (so-called "crosstalk") tends to occur such that a part of the mark on the adjacent track is read. According to a verifying experiment performed by the inventors, the following fact has been revealed. That is, if the track pitch TP is smaller than $0.35 \times (\lambda/NA)$ provided that $\lambda$ represents the wavelength of the laser beam and NA represents the numerical aperture of the light-collecting lens for the laser beam, for example, the cross erase is increased on the optical disk based on the phase-change recording system. If the track pitch TP is larger than $0.7 \times (\lambda/NA)$, it is difficult to realize the large capacity. Therefore, for example, in the case of the optical disk based on the phase-change recording system, when the track pitch TP is set to be a value within a range of $0.35 \times (\lambda/NA) \leq TP \leq 0.7 \times (\lambda/NA)$, the cross erase can be greatly reduced even in the case of the narrow track pitch. Further, the inventors have found out that in the case of the optical disk of the organic dye type, when the track pitch TP is set to be a value within a range of $0.35 \times (\lambda/NA) \leq TP \leq 0.7 \times (\lambda/NA)$, the crosstalk can be suppressed even in the case of the narrow track pitch.

It is preferable for the optical disk of the present invention that the user information is recorded on the guide groove and the area between the guide grooves respectively. When the information or the user information is recorded on both of the guide groove (groove) and the portion (land) between the guide grooves, it is possible to further increase the recording density.

It is preferable for the optical disk of the present invention that the optical disk comprises a recording layer which is formed of a phase-change material containing Bi, Ge, and Te, and the recording layer is provided in the first area and the second area. It is especially preferable that the recording layer is formed of a phase-change material in which the composition ratio of Bi, Ge, and Te satisfies $((GeTe)_x(Bi_2Te_3)_{1-x})_{1-y}Ge_y$ ($0.3 \leq x < 1$, $0 < y \leq 0.4$). The user data and the information about the reflectance of the optical disk are recorded in the recording layer formed in the first area (user data area) ad the second area (bar code area) respectively.

The practical composition range exists in an area obtained by connecting GeTe and $Bi_2Te_3$ in a triangular composition diagram having the apexes of Bi, Ge, and Te as disclosed in an exemplary conventional technique (for example, Japanese Patent Application Laid-open No. 62-209741). However, according to a verifying experiment, the inventors have found that when the recording layer is formed with the phase-change material in an area in which Ge is excessively added as compared with those disposed on the line obtained by connecting GeTe and $Bi_2Te_3$, it is possible to obtain the optical disk which provides satisfactory signal qualities and which has more excellent repeating durability.

The hypothesis, which is assumed for the cause of the above by the inventors, is as follows. Within a range clarified at present, the Bi—Ge—Te-based material includes compounds of GeTe, $Bi_2Te_3$, $Bi_2Ge_3Te_6$, $Bi_2GeTe_4$, and $Bi_4GeTe_7$. Although the process differs depending on the composition of the Bi—Ge—Te-based material, the following consideration may be approved. That is, when the recrystallization occurs immediately after the melting of the recording layer, the recrystallization occurs from the outer edge portions of the melted area in an order starting from Bi, Ge, Te, and those having the high melting points of the compounds described above. The substances are listed as follows in an order starting from those having the high melting points.

Ge: about 937° C.;
GeTe: about 725° C.;
$Bi_2Ge_3Te_6$: about 650° C.;
$Bi_2Te_3$: about 590° C.;
$Bi_2GeTe_4$: about 584° C.;
$Bi_4GeTe_7$: about 564° C.;
Te: about 450° C.;
Bi: about 271° C.

That is, the melting point of Ge is highest. Therefore, it is considered that Ge tends to be segregated at the outer edge portion of the melted area (recording mark) of the recording layer in the recording layer formed of the Bi—Ge—Te-based phase-change material added with excessive Ge to those disposed on the line obtained by connecting GeTe and $Bi_2Te_3$ in the triangular composition diagram having the apexes of Bi, Ge, and Te. When Ge excessively exists at the outer edge portion of the melted area, then the crystallization speed is slow at the outer edge portion of the melted area, and the recrystallization from the outer edge portion is consequently suppressed. As a result, it is considered that the occurrence of "band" of recrystallization, which would be otherwise caused by the rewriting performed many times, can be suppressed. Simultaneously with the phenomenon as described above, the material having a lower melting point tends to be segregated in the vicinity of the center of the track (recording mark). Therefore, the crystallization speed becomes high, and it is possible to obtain the satisfactory erasing performance even in the case of the high speed recording. However, if Ge is added too excessively, the crystallization speed is lowered. Therefore, it is important that Ge is added appropriately.

The following factors are important for the material for forming the recording layer in view of the storage life of the recording mark in the amorphous state. That is, a plurality of phases in the amorphous state are not present, the crystallization temperature of the recording layer material is high, and the activation energy is large when the amorphous portion is crystallized. The inventors have found out that the conditions as described above are satisfied with the composition in the vicinity of $Ge_{50}Te_{50}$ in the triangular composition diagram having the apexes of Bi, Ge, and Te. One of the causes of this fact is considered to be as follows. That is, as also disclosed in an exemplary conventional technique (Japanese Patent Application Laid-open No. 62-209741), the crystallization temperature of GeTe is about 200° C. which is high, and the crystallization temperature is lowered as the composition approaches $Bi_2Te_3$.

According to a verifying experiment, the inventors have found out that when the composition is in the vicinity $Ge_{50}Te_{50}$, the amorphous state is hardly changed and the satisfactory erasing characteristic is obtained even after the long term storage. However, if the amount of GeTe is too large, then the crystallization speed is lowered, and it is impossible to perform any high speed recording. If the amount of $Bi_2Te_3$ is too large, the storage life is deteriorated, because the crystallization temperature is lowered. Therefore, the following fact has been revealed in relation to the optimum composition for the recording layer material. That is, it is preferable to use a Bi—Ge—Te-based material in an area in which an appropriate amount of $Bi_2Te_3$ is added to $Ge_{50}Te_{50}$, and Ge exists excessively. Specifically, the inventors have found out the fact that the recording layer is appropriately formed by using the phase-change material having the composition which satisfies $((GeTe)_x(Bi_2Te_3)_{1-x})_{1-y}Ge_y$, ($0.3 \leq x < 1$, $0 < y \leq 0.4$) with respect to the composition ratio of Bi, Ge, and Te. When a nucleus-generating layer, which contains, for example, $Bi_2Te_3$, SnTe, and PbTe, is provided adjacently to the recording layer, it is possible to further improve the effect to suppress the recrystallization. In the case of the optical disk of the present invention, it is enough that the recording layer material maintains the relationship of the composition range as described above even when any impurity is mixed. The effect of the present invention is not lost on condition that the impurity is mixed at an atomic % within 1%.

It is preferable for the optical disk of the present invention that the optical disk comprises a recording layer containing an organic dye, and the recording layer is provided in the first area and the second area.

According to a second aspect of the present invention, there is provided a recording and reproducing apparatus for an optical disk on which information about a reflectance of the optical disk is recorded in an area in which a plurality of marks radially extending are arranged in a track direction in the optical disk; the recording and reproducing apparatus comprising an optical head which radiates a light beam onto the optical disk; a signal processing circuit which reproduces information on the basis of a reproduced signal detected by the optical head; a gain-adjusting circuit which adjusts an amplification factor of the reproduced signal; and a discriminating circuit which identifies a type of the optical disk on the basis of the information about the reflectance of the optical disk; wherein the gain-adjusting circuit adjusts the amplification factor of the reproduced signal on the basis of a result of judgment performed by the discriminating circuit.

It is preferable for the recording and reproducing apparatus of the present invention that the information about the reflectance of the optical disk is information which indicates a relationship between a reflectance in a recorded state and a reflectance in a non-recorded state in a user information area on the optical disk.

According to a third aspect of the present invention, there is provided a reproducing method on an optical disk on which information about a reflectance of the optical disk is recorded in an area in which a plurality of marks radially extending are arranged in a track direction in the optical disk; the reproducing method comprising the steps of: radiating a light beam onto the area; reproducing the information about the reflectance of the optical disk on the basis of a reflected light beam from the area; determining an amplification factor of a reproduced signal on the basis of the reproduced information about the reflectance of the optical disk; and reproducing information recorded in an area other than the area with the determined amplification factor for the reproduced signal.

It is preferable for the reproducing method of the present invention that the information about the reflectance of the optical disk is information which indicates a relationship between a reflectance in a recorded state and a reflectance in a non-recorded state in a user information area on the optical disk.

According to a fourth aspect of the present invention, there is provided a method for producing an optical disk; comprising the steps of: providing a recording film in the optical disk; and radiating a light beam onto the recording film in a predetermined area of the optical disk to form a mark group in which a plurality of marks radially extending are arranged in a track direction in the optical disk; wherein the mark group is formed as information about a reflectance of the optical disk.

It is preferable for the production method of the present invention that the information about the reflectance of the optical disk is information which indicates a relationship between a reflectance in a recorded state and a reflectance in a non-recorded state in a user information area on the optical disk.

It is preferable for the production method of the present invention that the recording film is formed of a phase-change material, and the step of forming the mark group comprises recording, as the mark group in the recording film, the information which indicates the relationship between the reflectance in the recorded state and the reflectance in the non-recorded state in the user information area, by adjusting an intensity of the light beam on the basis of the relationship between the reflectance in the recorded state and the reflectance in the non-recorded state in the user information area.

The method, in which the bar code-shaped mark group extending in the radial directions is formed by radiating the light beam onto the recording film in the predetermined area (bar code area) of the optical disk based on the phase-change recording system, includes, for example, a method in which the high power light beam is radiated onto the predetermined portion in the bar code area depending on the information to be recorded to thermally cut the recording film formed on the optical disk, and a method in which the recording film formed of the phase-change material is provided on the bar code area, and the light beam is radiated onto the recording film while modulating the intensity of the light beam depending on the information to form the areas in the crystalline state and the amorphous state in the recording film in the bar code area so that the bar code-shaped mark group is recorded. In the production method of the present invention, it is especially preferred that the bar code-shaped mark group is formed in accordance with the latter method. The latter method will be further explained below.

The recording film, which is formed of the phase-change material, is formed, for example, by the sputtering. The recording film is in the amorphous state immediately after the formation. Therefore, when the bar code-shaped mark group is formed in the state immediately after the formation of the recording film, it is preferable that the amorphous state (recorded state) is utilized as it is, and only a predetermined portion is crystallized (non-recorded state) depending on the information. This forming method can be also performed by using an apparatus which is usable when the entire surface of the optical disk is initially crystallized (simply referred to as "initialization" as well). Alternatively, the bar code-shaped mark group may be recorded in the bar code area after initializing the area other than the bar code area.

In the method for forming the bar code area of the present invention, when the bar code-shaped mark group is formed, the intensity modulation pattern of the light beam is changed into the reverse pattern depending on the type of the optical disk (HL disk or LH disk). Accordingly, the information about the reflectance pattern having the same polarity is formed irrelevant to the type of the optical disk.

FIG. 3 shows an example of the method for forming the bar code area of the present invention on the optical disk based on the phase-change recording system. For example, FIG. 3C shows an intensity modulation pattern of the laser beam to be radiated onto the HL disk when the information about a reflectance pattern as shown in FIG. 3A is recorded in the bar code area. In the case of the HL disk, as shown in FIG. 3C, the crystallization is caused such that the light beam having an intensity to effect the crystallization (600 mW in FIG. 3C) is radiated onto the portion (portion in the non-recorded state) intended to have a high reflectance as an area H shown in FIG. 3A, and the amorphous state is maintained such that the light beam is not radiated or the light beam having a weak intensity (150 mW in FIG. 3C) is radiated onto the portion (portion in the recorded state) intended to have a low reflectance as an area L shown in FIG. 3A. In the case of the HL disk, the bar code-shaped mark group, which corresponds to the reflectance pattern as shown in FIG. 3A, can be formed by radiating the light beam with the intensity modulation pattern as shown in FIG. 3C.

On the other hand, FIG. 3B shows an intensity modulation pattern of the light beam to be radiated when the bar code information having a reflectance pattern as shown in FIG. 3A is recorded on the LH disk. In the case of the LH disk, as shown in FIG. 3B, the amorphous state is maintained such that the light beam is not radiated or the light beam having a weak intensity (150 mW in FIG. 3B) is radiated onto the portion intended to have a high reflectance (portion in the recorded state) as an area H shown in FIG. 3A, and the crystallization is caused such that the light beam having an intensity to effect the crystallization (600 mW in FIG. 3B) is radiated onto the portion intended to have a low reflectance (portion in the non-recorded state) as an area L shown in FIG. 3A. In the case of the LH disk, the light beam is radiated with the intensity modulation pattern as shown in FIG. 3B, and thus it is possible to form the bar code-shaped mark group corresponding to the reflectance pattern as shown in FIG. 3A.

As clarified from FIG. 3, when the bar code-shaped mark group is formed in the recording film formed with the phase-change material, the intensity modulation pattern of the light beam for the HL disk is reverse to the pattern for the LH disk as shown in FIGS. 3B and 3C. Accordingly, the information about the same reflectance pattern (FIG. 3A) can be formed on both of the HL disk and the LH disk. When the information is reproduced from the bar code areas in which the information is recorded in accordance with the forming method as described above, the reproduction can be performed with the same value of the reflectance range for both of the HL disk and the LH disk. Therefore, when the information in the bar code area is reproduced, it is unnecessary to perform, for example, the adjustment of the gain depending on the type of the optical disk. It is possible to reproduce the information in the bar code area quickly and highly reliably.

It is preferable for the production method of the present invention that the recording film contains an organic dye, and the step of forming the mark group comprises recording, as the mark group in the recording film, the information which indicates the relationship between the reflectance in the recorded state and the reflectance in the non-recorded state in the user information area, by adjusting an intensity of the light beam on the basis of the relationship between the reflectance in the recorded state and the reflectance in the non-recorded state in the user information area.

The method, in which the bar code-shaped mark group extending in the radial directions is formed by radiating the light beam onto the recording film in the predetermined area (bar code area) of the optical disk of the organic dye type, includes, for example, a method in which the high power light beam is radiated onto the predetermined portion in the bar code area depending on the information to be recorded to thermally cut the recording film formed on the optical disk in the same manner as in the optical disk based on the phase-change recording system, and a method in which the recording film containing the organic dye is provided on the bar code area, and the light beam is radiated onto the recording film while modulating the intensity of the light beam depending on the information to perform the recording in the recording film in the bar code area so that the bar code-shaped mark group is recorded. In the production method of the present invention, it is especially preferred that the bar code-shaped mark group is formed in accordance with the latter method, when the optical disk of the organic dye type is produced. The latter method will be further explained below.

The recording film, which contains the organic dye, is formed, for example, by the spin coat. The state immediately after the formation corresponds to the non-recorded state. Therefore, when the bar code-shaped mark group is formed in the state immediately after the formation of the recording film, it is preferable that the recording is performed on only the predetermined portion depending on the information to give the recorded state.

In the method for forming the bar code area of the present invention, when the bar code-shaped mark group is formed, the intensity modulation pattern of the light beam is changed into the reverse pattern depending on the type of the optical disk (HL disk or LH disk). Accordingly, the information about the reflectance pattern having the same polarity is formed irrelevant to the type of the optical disk.

FIG. 6 shows an example of the method for forming the bar code area of the present invention on the optical disk of the organic dye type. For example, FIG. 6B shows an intensity modulation pattern of the laser beam to be radiated onto the HL disk when the information about a reflectance pattern as shown in FIG. 6A is recorded in the bar code area. In the case of the HL disk, as shown in FIG. 6B, the non-recorded state is maintained such that the light beam is not radiated or the light beam having a weak intensity (0.5 mW in FIG. 6B) to cause no change in the recording film is radiated onto the portion (portion in the non-recorded state) intended to have a high reflectance as an area H shown in FIG. 6A, and the change is made to the recorded state such that the light beam having an intensity to effect the recording (10 mW in FIG. 6B) is radiated onto the portion (portion in the recorded state) intended to have a low reflectance as an area L shown in FIG. 6A. In the case of the HL disk, the light beam is radiated with the intensity modulation pattern as shown in FIG. 6B, and thus it is possible to form the bar code-shaped mark group corresponding to the reflectance pattern as shown in FIG. 6A.

On the other hand, FIG. 6C shows an intensity modulation pattern of the light beam to be radiated when the bar code information having a reflectance pattern as shown in FIG. 6A is recorded on the LH disk. In the case of the LH disk, as shown in FIG. 6C, the recorded state is given such that the light beam having an intensity to effect the recording (10 mW in FIG. 6C) is radiated onto the portion (portion in the recorded state) intended to have a high reflectance as an area H shown in FIG. 6A, and the non-recorded state is maintained such that the light beam is not radiated or the light beam having a weak intensity to cause no change in the recording film (0.5 mW in FIG. 6C) is radiated onto the portion (portion in the non-recorded state) intended to have a low reflectance as an area L shown in FIG. 6A. In the case of the LH disk, the bar code-shaped mark group, which corresponds to the reflectance pattern as shown in FIG. 6A, can be formed by radiating the light beam with the intensity modulation pattern as shown in FIG. 6C.

As clarified from FIG. 6, when the bar code-shaped mark group is formed in the recording film containing the organic dye, the intensity modulation pattern of the light beam for the HL disk is reverse to the pattern for the LH disk as shown in FIGS. 6B and 6C. Accordingly, the information about the same reflectance pattern (FIG. 6A) can be formed on both of the HL disk and the LH disk. When the information is reproduced from the bar code areas in which the information is recorded in accordance with the forming method as described above, the reproduction can be performed with approximately the same value of the reflectance range for both of the HL disk and the LH disk. Therefore, when the information in the bar code area is reproduced, it is unnecessary to perform, for example, the adjustment of the gain depending on the type of the optical disk. It is possible to reproduce the information in the bar code area quickly and highly reliably.

According to the optical disk of the present invention, the information about the reflectance of the optical disk is recorded in the bar code area. Therefore, the information can be easily obtained without strictly performing the tracking control and the gain adjustment. Accordingly, it is possible to perform the optimum gain adjustment for the reproduced signal quickly. Therefore, when the detection is performed for the information in the control data area and the user data area of the optical disk as well as the servo signal for the tracking, the reproduction can be performed quickly irrelevant to the type of the optical disk. Further, it is possible to detect the reproduced signal having the sufficient amplitude. Therefore, it is possible to reproduce the information more reliably.

According to the recording and reproducing apparatus and the reproducing method of the present invention, the information about the reflectance of the optical disk recorded in the bar code area of the optical disk is detected without strictly performing the tracking control and the gain adjustment. The type of the optical disk is discriminated on the basis of the information to determine the optimum amplification factor of the reproduced signal. Therefore, when the detection is performed for the information in the control data area and the user data area of the optical disk as well as the servo signal for the tracking, the reproduction can be performed quickly irrelevant to the type of the optical disk. Further, it is possible to detect the reproduced signal having the sufficient amplitude. Therefore, it is possible to reproduce the information more reliably.

According to the method for producing the optical disk of the present invention, when the bar code-shaped marks are formed in the recording film formed of the phase-change material, or when the bar code-shaped marks are formed in the recording film containing the organic dye, as shown in FIG. 3 or FIG. 6, then the pattern of the intensity modulation of the light beam is made into the reverse pattern depending on the type of the optical disk, and thus the information having the same reflectance pattern can be formed on both of the HL disk and the LH disk. Therefore, when the information in the bar code area is reproduced on the optical disk manufactured in accordance with the production method of the present invention, the information can be reproduced with the value within approximately the same reflectance range irrelevant to the type of the optical disk (HL disk or LH disk). As a result, when the information in the bar code area is reproduced, it is unnecessary to perform, for example, the gain adjustment depending on the type of the optical disk. It is possible to obtain the optical disk which makes it possible to reproduce the information in the bar code area quickly and highly reliably.

BRIEF DESCRIPTION OF THE DRAWINGS

FIGS. 3A to 3C show a reflectance pattern of information for a bar code area C on the optical disk manufactured in the first or second embodiment and situations of intensity modulation of the laser beam for forming the pattern, wherein FIG. 3A shows the reflectance pattern, FIG. 3B shows the intensity modulation pattern for the laser beam for an LH disk based on the use of a phase-change recording film, and FIG. 3C shows the intensity modulation pattern for the laser beam for an HL disk based on the use of a phase-change recording film.

FIGS. 6A to 6C show a reflectance pattern of information for a bar code area C on an optical disk manufactured in a third or fourth embodiment and situations of intensity modulation of the laser beam for forming the pattern, wherein FIG. 6A shows the reflectance pattern, FIG. 6B shows the intensity modulation pattern for the laser beam for an HL disk based on the use of an organic dye recording film, and FIG. 6C shows the intensity modulation pattern for the laser beam for an LH disk based on the use of an organic dye recording film.

DESCRIPTION OF THE PREFERRED EMBODIMENTS

Embodiments of the optical disk and the recording and reproducing apparatus of the present invention will be explained below. However, the present invention is not limited thereto.

First Embodiment

Structure of Optical Disk

Figure 1:
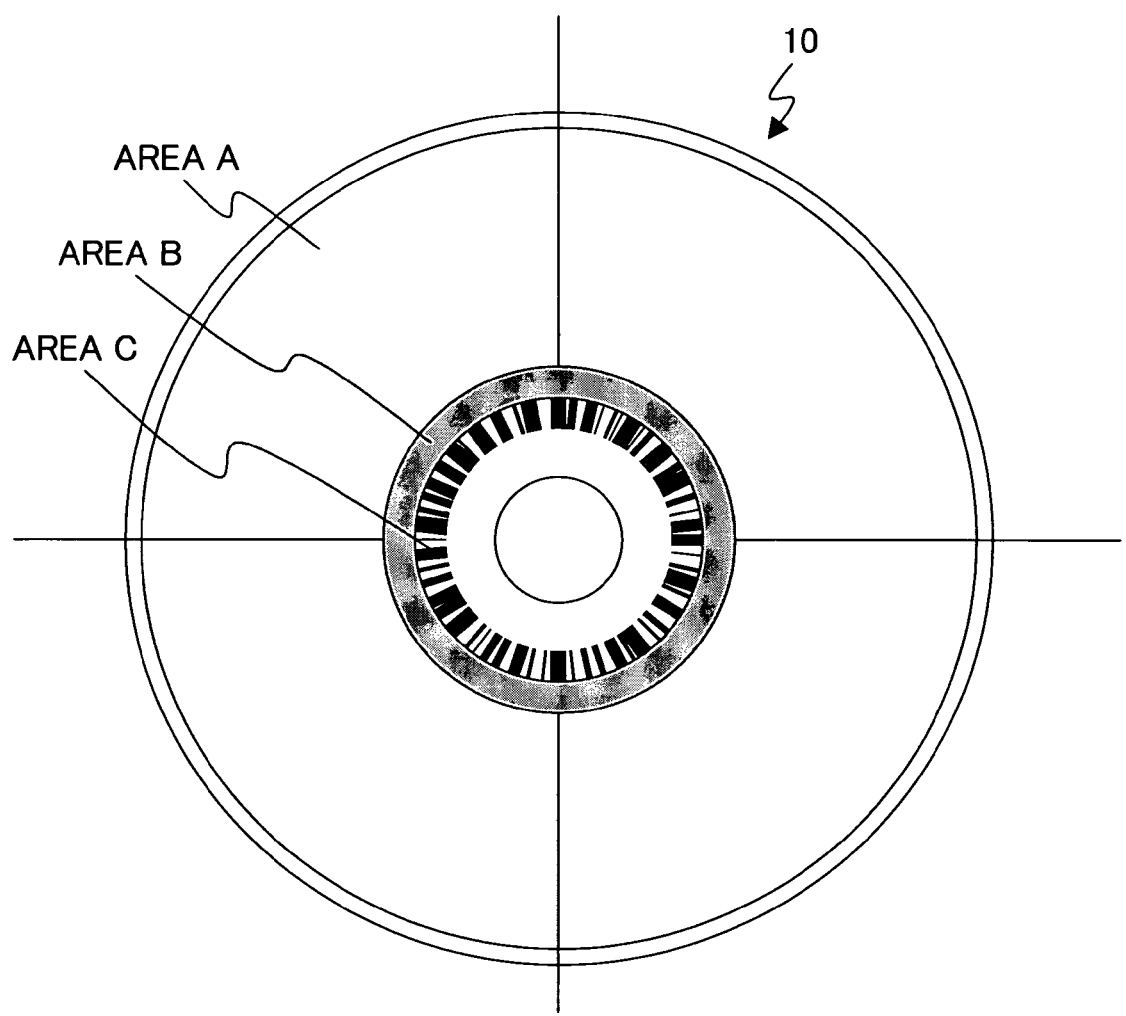
FIG. 1 shows a schematic plan view illustrating an optical disk manufactured in a first embodiment.

An HL disk based on the phase-change recording system was manufactured as the optical disk in a first embodiment. FIG. 1 shows a schematic plan view illustrating the optical disk manufactured in this embodiment. As shown in FIG. 1, those successively provided from the outer circumferential side on the optical disk 10 of this embodiment include a user data area A in which user data is recorded, a control data area B in which physical format information about the optical disk 10 is recorded, and a bar code area C in which information is recorded with a bar code-shaped mark group (also referred to as "bar code information") including a plurality of marks extending in the radial directions and arranged in the track direction.

The user data area A is provided in the area of the optical disk 10 ranging over radii from about 23.8 mm to 58.5 mm. A groove having a depth of 45 nm is formed in a spiral form at a track pitch of 0.68 μm in the user data area A. A header recording section (not shown) including the address information was formed by deflecting the groove in the radial direction in the user data area A.

The control data area B is provided in the area of the optical disk 10 ranging over radii from about 23.3 mm to 23.8 mm. The physical format information about the optical disk 10 was formed with a 1-7 modulation pit array having a track pitch of 0.68 μm and a shortest mark length of 0.4 μm. A connection area of about 10 μm (not shown) was provided between the user data area A and the control data area B.

The bar code area C is provided in the area of the optical disk 10 ranging over radii from about 22.2 mm to 23.2 mm. Those recorded in the bar code area C include not only the disk identification information such as media ID and version information but also the information which indicates the relationship between the reflectance in the non-recorded state and the reflectance in the recorded state in the user data area A of the optical disk 10. Specifically, the optical disk 10 manufactured in this embodiment is an HL disk. Therefore, the information, which indicates the decrease in the reflectance in accordance with the recording, was recorded at a predetermined position in the bar code area C. Values of the reflectance in the non-recorded state and the reflectance in the recorded state in the user data area A may be recorded as the information about the reflectance of the optical disk in the bar code area C. The method for recording the information in the bar code area C will be described later on.

Method for Producing Optical Disk

Figure 2:
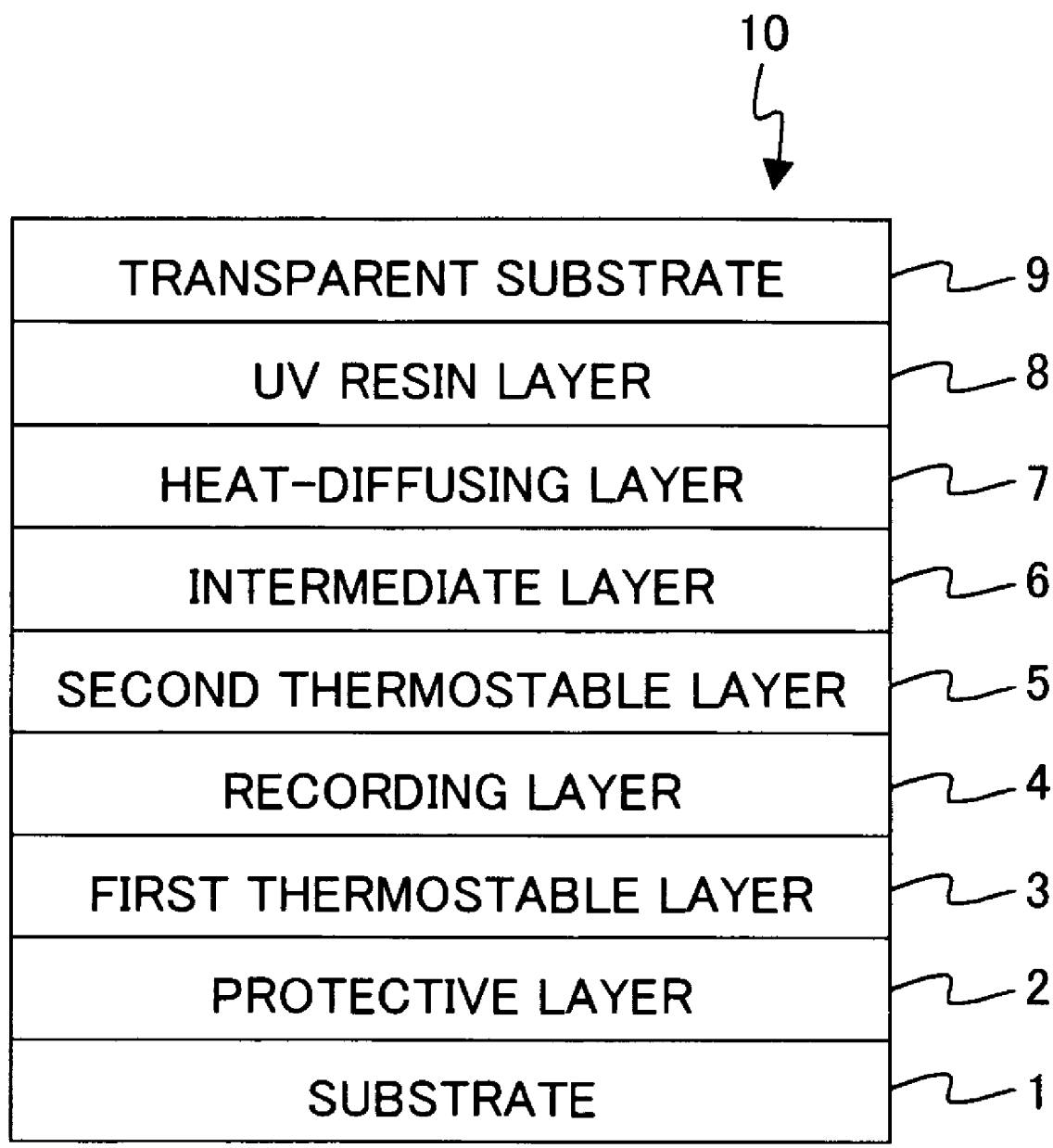
FIG. 2 shows a schematic sectional view illustrating the optical disk manufactured in the first embodiment.

FIG. 2 shows a schematic sectional view illustrating the optical disk manufactured in this embodiment. As shown in FIG. 2, the optical disk 10 manufactured in this embodiment has a structure including a protective layer 2, a first thermostable layer 3, a recording layer 4, a second thermostable layer 5, an intermediate layer 6, a heat-diffusing layer 7, a UV resin layer 8, and a transparent substrate 9 which are successively stacked on a substrate 1. In this embodiment, the respective layers were formed in the user data area A, the control data area B, and the bar code area C of the optical disk 10. Subsequently, an explanation will be made about a method for producing the optical disk of this embodiment.

At first, the substrate 1 made of polycarbonate having a diameter of 120 mm and a thickness of 0.6 mm was manufactured by the injection molding by using a stamper. In this procedure, the spiral groove (groove) having a track pitch of 0.68 μm and a depth of 45 nm was formed in the user data area A, and the pit array having a track pitch of 0.68 μm and a shortest mark length of 0.4 μm was formed in the control data area B.

Subsequently, $(ZnS)_{80}(SiO_2)_{20}$ was formed as the protective layer 2 to have a thickness of 58 nm on the substrate 1 by the sputtering. Subsequently, $Ge_8Cr_2$—N (expressed by a relative ratio) was formed as the first thermostable layer 3 to have a thickness of 1 nm on the protective layer 2 by the sputtering. Further, $Bi_3Ge_{47}Te_{50}$ was formed as the recording layer 4 to have a thickness of 13 nm on the first thermostable layer 3 by the sputtering. Subsequently, $Ge_8Cr_2$—N (expressed by a relative ratio) was formed as the second thermostable layer 5 to have a thickness of 1 nm on the recording layer 4 by the sputtering. Subsequently, $(ZnS)_{50}(SiO_2)_{50}$ was formed as the intermediate layer 6 to have a thickness of 48 nm on the second thermostable layer 5 by the sputtering.

Further, $Al_{99}Ti_1$ was formed as the heat-diffusing layer 7 to have a thickness of 150 nm on the intermediate layer 6 by the sputtering.

Subsequently, an ultraviolet-curable resin was applied as the UV resin layer 8 onto the heat-diffusing layer 7. Further, the transparent substrate 9 made of polycarbonate having a thickness of 0.6 mm was placed thereon. Subsequently, the ultraviolet light was radiated through the transparent substrate 9 to cure the ultraviolet-curable resin so that the transparent substrate 9 was stuck onto the UV resin layer 8. The optical disk 10 based on the phase-change recording system shown in FIG. 2 was obtained in accordance with the production method described above.

In the case of the optical disk 10 manufactured in this embodiment, the reflectance of the portion in the non-recorded state (crystalline state) was 18%, and the reflectance of the portion in the recorded state (amorphous state), i.e., the recording mark portion was 5%.

Method for Forming Bar Code Area C

As described above, in the case of the optical disk 10 manufactured in this embodiment, the bar code area C was formed in the area having the width of 1 mm and the radii from 22.2 mm to 23.2 mm of the optical disk. The bar code-shaped mark group, which was to be formed in the bar code area C, was formed as follows by using an initializing apparatus (not shown). However, in this embodiment, the bar code-shaped mark group was formed in the bar code area C before initializing (crystallizing) the entire surface of the optical disk. The bar code-shaped mark group may be recorded in the bar code area C after initializing only the user data area A and the control data area B.

The optical disk manufactured in this embodiment was installed into the initializing apparatus, the optical disk was rotated at 2,400 rpm, and the laser beam having a wavelength of 810 nm was radiated onto the optical disk. In this procedure, the laser beam spot was focused to provide such a shape that the length in the radial direction of the optical disk was about 50 µm, and the length (width) in the track direction was about 1 µm. The laser beam was radiated onto the predetermined position in the bar code area C depending on the information to be recorded in the bar code area C. However, the power of the laser beam radiated onto the optical disk was modulated between 600 mW and 150 mW.

Figure 3A:
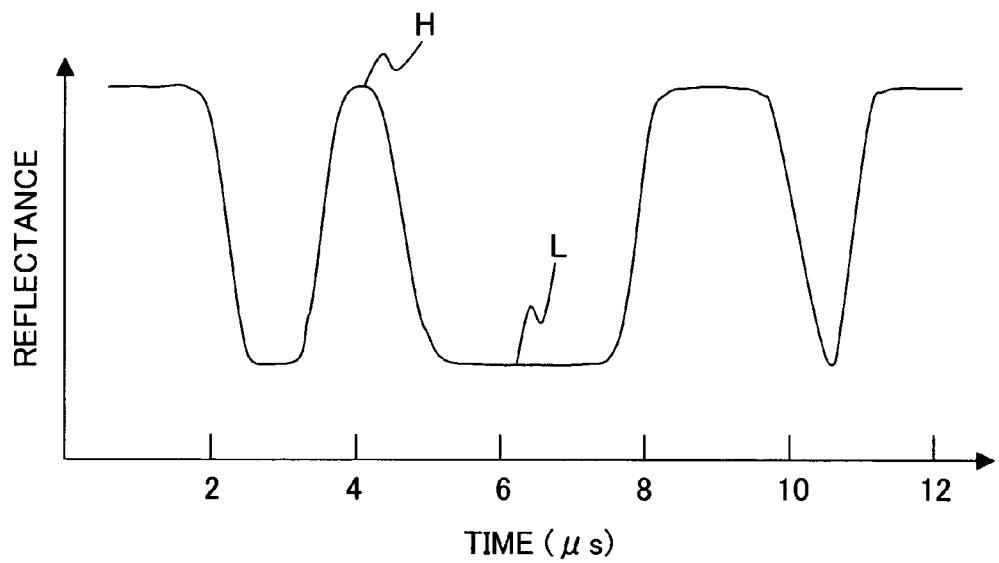
Figure 3B:
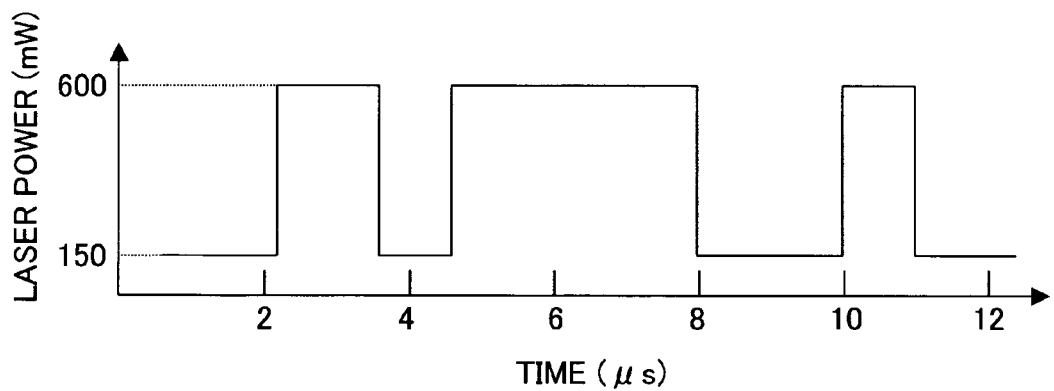
Figure 3C:
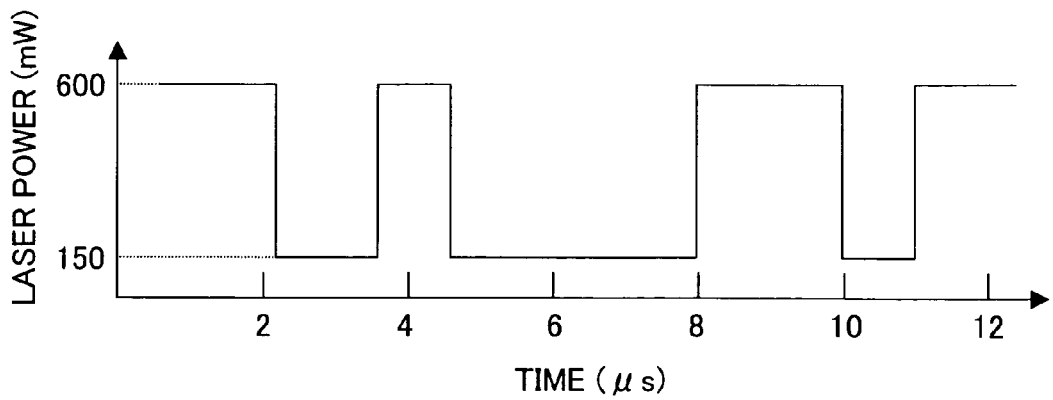

FIG. 3 shows a pattern of the intensity modulation for the laser beam when the bar code-shaped mark group is formed in the bar code area C. In FIG. 3, the situations of the intensity modulation for the laser beam, which are usable when the bar code information of the reflectance pattern as shown in FIG. 3A, are shown in FIGS. 3B and 3C. FIG. 3B shows the intensity modulation pattern for the laser beam for the LH disk, and FIG. 3C shows the intensity modulation pattern for the laser beam for the HL disk. The optical disk manufactured in this embodiment is the HL disk. Therefore, the intensity modulation was performed for the laser beam as shown in FIG. 3C to record the bar code information. The entire surface of the recording layer of the optical disk is in the state immediately after the sputtering, i.e., the amorphous state immediately before recording the information in the bar code area C. Therefore, in this embodiment, the area, which is irradiated with the high laser power (600 mW), is heated and changed into the crystalline state, and the reflectance of the corresponding portion is changed. Thus, the bar code information is recorded.

In the case of the HL disk, as shown in FIG. 3C, the crystallization was caused such that the light beam having an intensity to effect the crystallization (600 mW in FIG. 3C) was radiated onto the portion (portion in the non-recorded state) intended to have a high reflectance as an area H shown in FIG. 3A, and the amorphous state was maintained such that the light beam having a weak intensity (150 mW in FIG. 3C) was radiated onto the portion (portion in the recorded state) intended to have a low reflectance as an area L shown in FIG. 3A. The bar code-shaped mark group, which corresponded to the reflectance pattern as shown in FIG. 3A, was formed by modulating the light beam intensity as described above.

Subsequently, the laser beam spot was moved radially outwardly for every one revolution of the optical disk, while allowing the longitudinal direction of the laser beam spot to be approximately coincident with the radial direction of the disk. In this procedure, the feed amount of the laser beam spot per one revolution was 36 µm. The pattern of the laser beam modulation (timing of the laser beam radiation) was synchronized with the information to be recorded for every one revolution of the disk so that the respective recording marks for forming the bar code-shaped mark group are formed radially with the same width with respect to the center of the optical disk as shown in the bar code area C in FIG. 1. In this embodiment, a plurality of recording marks each having a length of about 1 mm in the radial direction and a width of about 1 µm in the track direction were arranged in the track direction by rotating the optical disk by about 30 revolutions to form the bar code-shaped mark group in the bar code area C as shown in FIG. 1.

Second Embodiment

In a second embodiment, an LH disk based on the phase-change recording system was manufactured as the optical disk. The optical disk manufactured in this embodiment had the same schematic plan view as that shown in FIG. 1. Those recorded in the bar code area C include not only the optical disk identification information such as media ID and version information but also the information which indicates the relationship between the reflectance in the non-recorded state and the reflectance in the recorded state in the user data area A of the optical disk. Specifically, the optical disk manufactured in this embodiment is an LH disk. Therefore, the information, which indicates the increase in the reflectance in accordance with the recording, was recorded at a predetermined position in the bar code area C. Values of the reflectance in the non-recorded state and the reflectance in the recorded state in the user data area A may be recorded as the information about the reflectance of the optical disk in the bar code area C. The method for recording the information in the bar code area C will be described later on.

Method for Producing Optical Disk

Figure 4:
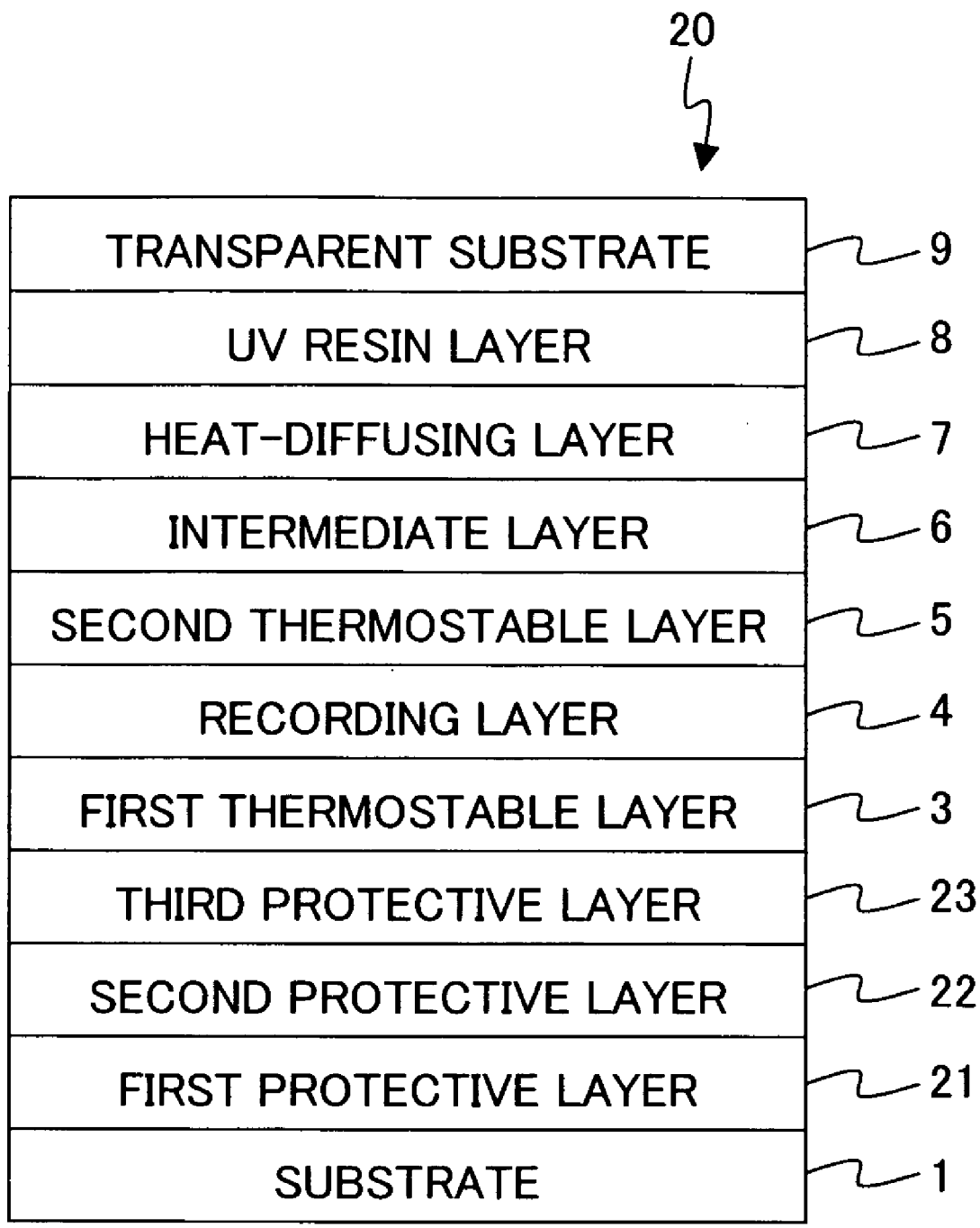
FIG. 4 shows a schematic sectional view illustrating the optical disk manufactured in the second embodiment.

FIG. 4 shows a schematic sectional view illustrating the optical disk manufactured in this embodiment. As shown in FIG. 4, the optical disk 20 manufactured in this embodiment has a structure including a first protective layer 21, a second protective layer 22, a third protective layer 23, a first thermostable layer 3, a recording layer 4, a second thermostable layer 5, an intermediate layer 6, a heat-diffusing layer 7, a UV resin layer 8, and a transparent substrate 9 which are successively stacked on a substrate 1. In this embodiment, the respective layers were formed in the user data area A, the control data area B, and the bar code area C of the optical disk 20. Subsequently, an explanation will be made about a method for producing the optical disk of this embodiment. However, the substrate 1 was manufactured in the same manner as in the first embodiment.

At first, $(ZnS)_{80}(SiO_2)_{20}$ was formed as the first protective layer 21 to have a thickness of 50 nm on the substrate 1 by the sputtering. Subsequently, $Al_2O_3$ was formed as the second protective layer 22 to have a thickness of 40 nm on the first protective layer 21 by the sputtering. Subsequently, $(ZnS)_{80}(SiO_2)_{20}$ was formed as the third protective layer 23 to have a thickness of 20 nm on the second protective layer 22 by the sputtering. That is, in the case of the optical disk of this embodiment, the protective layer had the three-layered structure. In this embodiment, the interference effect is utilized between the respective layers by making the protective layer to have the three-layered structure so that the reflectance is low in the area in the crystalline state corresponding to the non-recorded state, and the reflectance is high in the area in the amorphous state corresponding to the recorded state.

Subsequently, $Ge_8Cr_2$—N (expressed by a relative ratio) was formed as the first thermostable layer 3 to have a thickness of 2 nm on the third protective layer 23 by the sputtering. Subsequently, $Bi_3Ge_{47}Te_{50}$ was formed as the recording layer 4 to have a thickness of 10 nm on the first thermostable layer 3 by the sputtering. Further, $Ge_8Cr_2$—N (expressed by a relative ratio) was formed as the second thermostable layer 5 to have a thickness of 2 nm on the recording layer 4 by the sputtering. Subsequently, $(ZnS)_{50}(SiO_2)_{50}$ was formed as the intermediate layer 6 to have a thickness of 35 nm on the second thermostable layer 5 by the sputtering. Further, $Al_{99}Ti_1$ was formed as the heat-diffusing layer 7 to have a thickness of 150 nm on the intermediate layer 6 by the sputtering.

Subsequently, an ultraviolet-curable resin was applied as the UV resin layer 8 onto the heat-diffusing layer 7. Further, the transparent substrate 9 made of polycarbonate having a thickness of 0.6 mm was placed thereon. Subsequently, the ultraviolet light was radiated through the transparent substrate 9 to cure the ultraviolet-curable resin so that the transparent substrate 9 was stuck onto the UV resin layer 8. The optical disk 20 based on the phase-change recording system shown in FIG. 4 was obtained in accordance with the production method described above.

In the case of the optical disk 20 manufactured in this embodiment, the reflectance of the portion in the non-recorded state (crystalline state) was 5%, and the reflectance of the portion in the recorded state (amorphous state), i.e., the recording mark portion was 16%.

Method for Forming Bar Code Area C

In the case of the optical disk manufactured in this embodiment, the bar code area C was formed in the same manner as in the first embodiment except that the pattern of the intensity modulation for the laser beam was changed when the bar code-shaped mark group was formed in the bar code area C. In the following, an explanation will be made about a method for forming the bar code area C in the optical disk manufactured in this embodiment.

Also in this embodiment, the intensity modulation for the laser beam is conceived when the bar code information of the reflectance pattern as shown in FIG. 3A is recorded in the same manner as in the first embodiment. The optical disk manufactured in this embodiment is the LH disk. Therefore, the intensity modulation was performed for the laser beam as shown in FIG. 3B to record the bar code information. The entire surface of the recording layer of the optical disk is in the state immediately after the sputtering, i.e., the amorphous state immediately before recording the information in the bar code area C. Therefore, in this embodiment, the area, which is irradiated with the high laser power (600 mW), is heated and changed into the crystalline state, and the reflectance of the corresponding portion is changed. Thus, the information is recorded.

In the case of the LH disk, as shown in FIG. 3B, the amorphous state was maintained such that the laser beam having a weak intensity (150 mW in FIG. 3B) was radiated onto the portion intended to have a high reflectance (portion in the recorded state) as an area H shown in FIG. 3A, and the crystallization was caused such that the laser beam having an intensity to effect the crystallization (600 mW in FIG. 3B) was radiated onto the portion intended to have a low reflectance (portion in the non-recorded state) as an area L shown in FIG. 3A. The bar code-shaped mark group, which corresponded to the reflectance pattern as shown in FIG. 3A, was also formed by modulating the laser beam intensity as described above on the LH disk in the same manner as on the HL disk.

As clarified from FIG. 3, when the optical disk is the LH disk as in this embodiment, the information having the same reflectance pattern (FIG. 3A) can be formed by changing the intensity modulation pattern for the laser beam (FIG. 3B) into the pattern reverse to the intensity modulation pattern for the laser beam (FIG. 3C) for the HL disk (first embodiment). When the information is reproduced from the bar code area in which the information is recorded in accordance with the method as described above, the information can be reproduced with the value within the same reflectance range irrelevant to the type of the optical disk (HL disk or LH disk). Therefore, when the information in the bar code area C is reproduced, it is unnecessary to adjust, for example, the gain depending on the type of the optical disk. It is possible to reproduce the information in the bar code area C quickly and highly reliably.

Third Embodiment

Structure of Optical Disk

An HL disk having the organic dye recording film was manufactured as the optical disk in a third embodiment. The optical disk manufactured in this embodiment has the same schematic plan view as those of the first and second embodiments. As shown in FIG. 1, those successively provided from the outer circumferential side include a user data area A in which user data is recorded, a control data area B in which physical format information about the optical disk is recorded, and a bar code area C in which information is recorded with a bar code-shaped mark group (also referred to as "bar code information") including a plurality of marks extending in the radial directions and arranged in the track direction.

The user data area A is provided in the area of the optical disk ranging over radii from about 23.8 mm to 58.5 mm. A groove having a depth of 80 nm is formed in a spiral form at a track pitch of 0.4 μm in the user data area A. A header recording section (not shown) including the address information was formed by deflecting the groove in the radial direction in the user data area A.

The control data area B is provided in the area of the optical disk ranging over radii from about 23.3 mm to 23.8 mm. The physical format information about the optical disk was formed with a 1-7 modulation pit array having a track pitch of 0.68 μm and a shortest mark length of 0.4 μm. A connection area of about 10 μm (not shown) was provided between the user data area A and the control data area B.

The bar code area C is provided in the area of the optical disk ranging over radii from about 22.2 mm to 23.2 mm. Those recorded in the bar code area C include not only the disk identification information such as media ID and version information but also the information which indicates the relationship between the reflectance in the non-recorded state and the reflectance in the recorded state in the user data area A of the optical disk. Specifically, the optical disk manufactured in this embodiment is an HL disk. Therefore, the information, which indicates the decrease in the reflectance in accordance with the recording, was recorded at a predetermined position in the bar code area C. Values of the reflectance in the non-recorded state and the reflectance in the recorded state in the user data area A may be recorded as the information about the reflectance of the optical disk in the bar code area C. The method for recording the information in the bar code area C will be described later on.

Method for Producing Optical Disk

Figure 7:
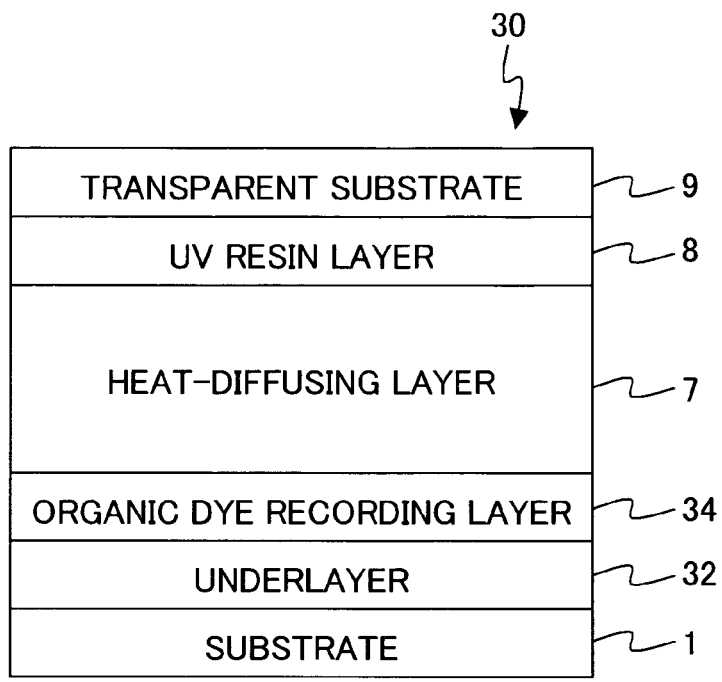
FIG. 7 shows a schematic sectional view illustrating the optical disk manufactured in the third embodiment.

FIG. 7 shows a schematic sectional view illustrating the optical disk of the organic dye type manufactured in this embodiment. As shown in FIG. 7, the optical disk 30 manufactured in this embodiment has a structure including an underlayer 32, an organic dye recording layer 34, a heat-diffusing layer 7, a UV resin layer 8, and a transparent substrate 9 which are successively stacked on a substrate 1. In this embodiment, the respective layers were formed in the user data area A, the control data area B, and the bar code area C of the optical disk 30. Subsequently, an explanation will be made about a method for producing the optical disk of this embodiment.

At first, the substrate 1 made of polycarbonate having a diameter of 120 mm and a thickness of 0.6 mm was manufactured by the injection molding by using a stamper. In this procedure, the spiral groove having a track pitch of 0.4 µm and a depth of 80 nm was formed in the user data area A, and the pit array having a track pitch of 0.68 µm and a shortest mark length of 0.4 µm was formed in the control data area B.

Subsequently, $(ZnS)_{80}(SiO_2)_{20}$ was formed as the underlayer 32 to have a thickness of 20 nm on the substrate 1 by the sputtering. Subsequently, the organic dye recording layer 34, which contained an organic dye represented by the following chemical formula (1) of carbostyril compound, was formed on the underlayer 32. Specifically, 0.5 g of the organic dye represented by the following chemical formula (1) was dissolved in 40 g of octafluoropentanol, which was ultrasonically dispersed at 40° C. for 30 minutes, followed by being filtrated through a filter of 0.2 µm. Subsequently, the filtrate was spin-coated onto the substrate 1 at a number of revolutions of 1,300 rpm, followed by being dried for 30 minutes in an oven at 80° C. to form the organic dye recording layer 34. The organic dye recording layer 34 had a thickness of 80 nm. Subsequently, $Ag_{97}Ru_2Cu_1$ was formed as the heat-diffusing layer 7 to have a thickness of 150 nm on the organic dye recording layer 34 by the sputtering.

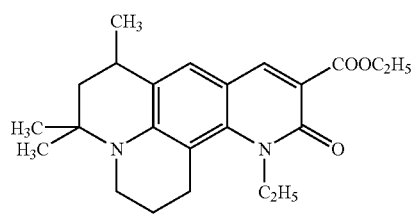

(1)

Subsequently, an ultraviolet-curable resin was applied as the UV resin layer 8 onto the heat-diffusing layer 7. Further, the transparent substrate 9 made of polycarbonate having a thickness of 0.6 mm was placed thereon. Subsequently, the ultraviolet light was radiated through the transparent substrate 9 to cure the ultraviolet-curable resin so that the transparent substrate 9 was stuck onto the UV resin layer 8. The optical disk 30 of the organic dye type shown in FIG. 7 was obtained in accordance with the production method described above.

In the case of the optical disk manufactured in this embodiment, the reflectance of the portion in the non-recorded state in the mirror area with neither groove nor pit was 40%, and the reflectance of the portion in the recorded state, i.e., the recording mark portion was 10%.

Method for Forming Bar Code Area C

As described above, in the case of the optical disk manufactured in this embodiment, the bar code area C was formed in the area having the width of 1 mm and the radii from 22.2 mm to 23.2 mm of the optical disk. The bar code-shaped mark group, which was to be formed in the bar code area C, was formed as follows by using a bar code-forming apparatus having a laser of a wavelength of 405 nm (not shown).

The optical disk manufactured in this embodiment was installed into the bar code-forming apparatus, the optical disk was rotated at 2,400 rpm, and the laser beam having the wavelength of 405 nm was radiated onto the optical disk. In this procedure, the laser beam spot was focused to provide such a shape that both of the length in the radial direction of the optical disk and the length (width) in the track direction were about 0.6 µm. The laser beam was radiated onto the predetermined position in the bar code area C depending on the information to be recorded in the bar code area C. However, the power of the laser beam radiated onto the optical disk was modulated between 10 mW and 0.5 mW.

Figure 6A:
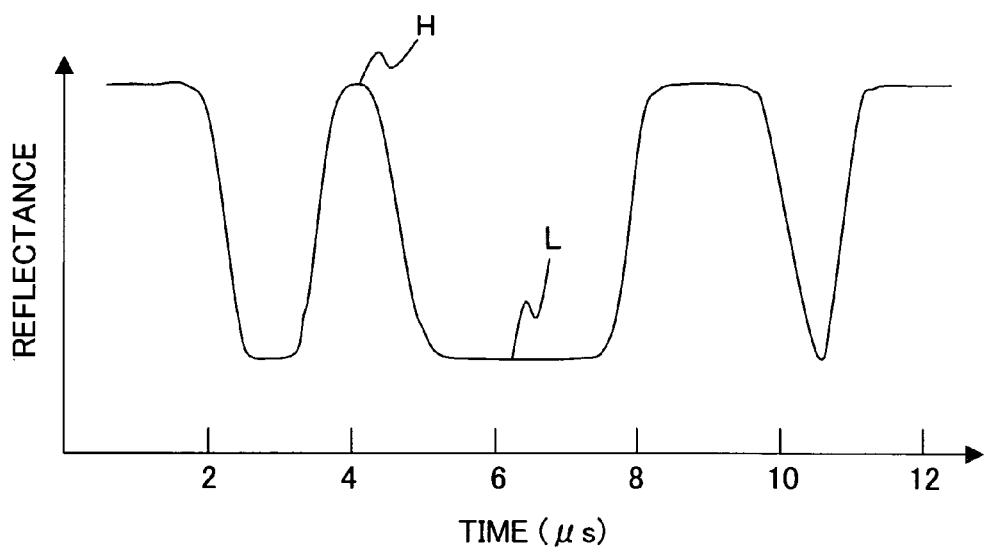
Figure 6B:
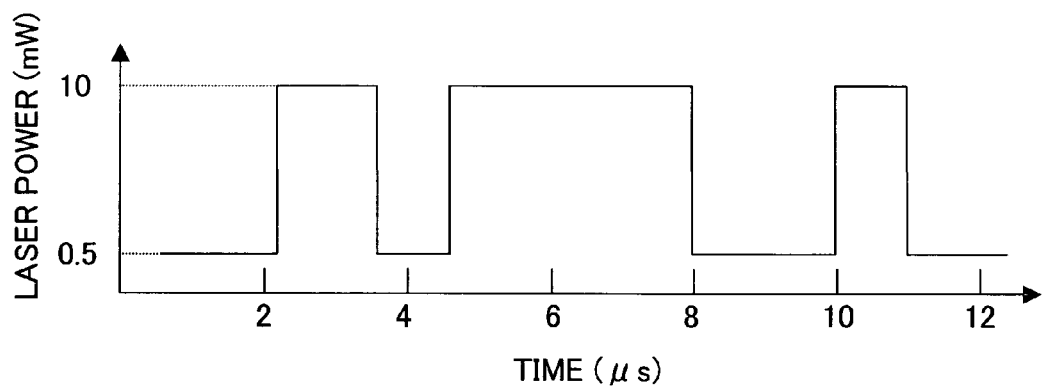
Figure 6C:
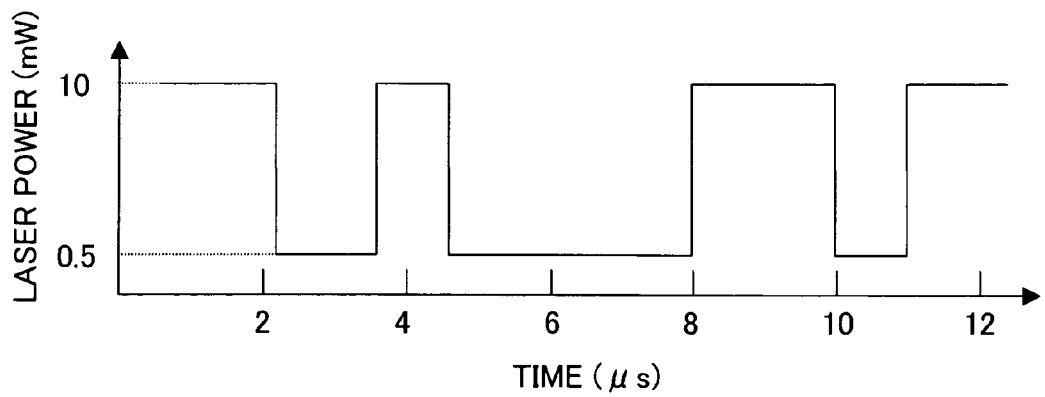

FIG. 6 shows a pattern of the intensity modulation for the laser beam when the bar code-shaped mark group is formed in the bar code area C. In FIG. 6, the situations of the intensity modulation for the laser beam, which are usable when the bar code information of the reflectance pattern as shown in FIG. 6A, are shown in FIGS. 6B and 6C. FIG. 6B shows the intensity modulation pattern for the laser beam for the HL disk, and FIG. 6C shows the intensity modulation pattern for the laser beam for the LH disk. The optical disk manufactured in this embodiment is the HL disk. Therefore, the intensity modulation was performed for the laser beam as shown in FIG. 6B to record the bar code information. The entire surface of the recording layer of the optical disk is in the non-recorded state immediately before recording the information in the bar code area C. Therefore, in this embodiment, the area, which is irradiated with the high laser power (10 mW), is heated and changed into the recorded state, and the reflectance of the corresponding portion is changed. Thus, the bar code information is recorded.

In the case of the HL disk, as shown in FIG. 6B, the non-recorded state was maintained such that the light beam having a weak intensity (0.5 mW in FIG. 6B) was radiated onto the portion intended to have a high reflectance (portion in the non-recorded state) as an area H shown in FIG. 6A, and the recorded state was given such that the light beam having an intensity to effect the recording (10 mW in FIG. 6B) was radiated onto the portion intended to have a low reflectance (portion in the recorded state) as an area L shown in FIG. 6A. The bar code-shaped mark group, which corresponded to the reflectance pattern as shown in FIG. 6A, was formed by modulating the light beam intensity as described above.

Subsequently, the laser beam spot was moved radially outwardly for every one revolution of the optical disk, while making the longitudinal direction of the laser beam spot to be approximately coincident with the radial direction of the disk. In this procedure, the feed amount of the laser beam spot per one revolution was not more than 0.6 μm. The pattern of the laser beam modulation (timing of the laser beam radiation) was synchronized with the information to be recorded for every one revolution of the disk so that the respective recording marks for forming the bar code-shaped mark group are formed radially with the same width with respect to the center of the optical disk as shown in the bar code area C in FIG. 1. In this embodiment, a plurality of recording marks each having a length of about 1 mm in the radial direction and a width of about 1 μm in the track direction were arranged in the track direction by rotating the optical disk by about 1,700 revolutions to form the bar code-shaped mark group in the bar code area C as shown in FIG. 1.

Fourth Embodiment

In a fourth embodiment, an LH disk having an organic dye recording layer was manufactured as the optical disk. The optical disk manufactured in this embodiment had the same schematic plan view as that described in the third embodiment, i.e., that shown in FIG. 1. Those recorded in the bar code area C include not only the optical disk identification information such as media ID and version information but also the information which indicates the relationship between the reflectance in the non-recorded state and the reflectance in the recorded state in the user data area A of the optical disk. Specifically, the optical disk manufactured in this embodiment is an LH disk. Therefore, the information, which indicates the increase in the reflectance in accordance with the recording, was recorded at a predetermined position in the bar code area C. Values of the reflectance in the non-recorded state and the reflectance in the recorded state in the user data area A may be recorded as the information about the reflectance of the optical disk in the bar code area C. The method for recording the information in the bar code area C will be described later on.

Method for Producing Optical Disk

Figure 8:
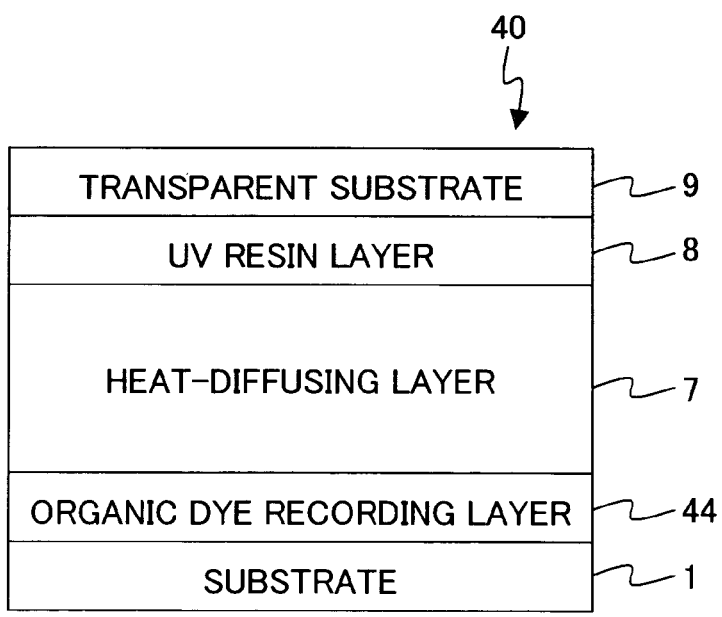
FIG. 8 shows a schematic sectional view illustrating the optical disk manufactured in the fourth embodiment.

FIG. 8 shows a schematic sectional view illustrating the optical disk manufactured in this embodiment. As shown in FIG. 8, the optical disk 40 manufactured in this embodiment has a structure including an organic dye recording layer 44, a heat-diffusing layer 7, a UV resin layer 8, and a transparent substrate 9 which are successively stacked on a substrate 1. In this embodiment, the respective layers were formed in the user data area A, the control data area B, and the bar code area C of the optical disk. Subsequently, an explanation will be made about a method for producing the optical disk of this embodiment. However, the substrate 1 was manufactured in the same manner as in the third embodiment.

At first, the organic dye recording layer 44, which contained an organic dye represented by the foregoing chemical formula (1) of carbostyril compound, was formed on the substrate 1 in the same manner as in the third embodiment. Specifically, 0.5 g of the organic dye represented by the foregoing chemical formula (1) was dissolved in 40 g of octafluoropentanol, which was ultrasonically dispersed at 40° C. for 30 minutes, followed by being filtrated through a filter of 0.2 μm. Subsequently, the filtrate was spin-coated onto the substrate 1 at a number of revolutions of 1,000 rpm, followed by being dried for 30 minutes in an oven at 80° C. to form the organic dye recording layer 44. The organic dye recording layer 44 had a thickness of 150 nm. Subsequently, $Ag_{97}Ru_2Cu_1$ was formed as the heat-diffusing layer 7 to have a thickness of 150 nm on the organic dye recording layer 44 by the sputtering.

Subsequently, an ultraviolet-curable resin was applied as the UV resin layer 8 onto the heat-diffusing layer 7. Further, the transparent substrate 9 made of polycarbonate having a thickness of 0.6 mm was placed thereon. Subsequently, the ultraviolet light was radiated through the transparent substrate 9 to cure the ultraviolet-curable resin so that the transparent substrate 9 was stuck onto the UV resin layer 8. The optical disk 40 of the organic dye recording type shown in FIG. 8 was obtained in accordance with the production method described above.

In the case of the optical disk manufactured in this embodiment, the reflectance of the portion in the non-recorded state was 16%, and the reflectance of the portion in the recorded state, i.e., the recording mark portion was 32%.

Method for Forming Bar Code Area C

In the case of the optical disk manufactured in this embodiment, the bar code area C was formed in the same manner as in the third embodiment except that the pattern of the intensity modulation for the laser beam was changed when the bar code-shaped mark group was formed in the bar code area C.

Also in this embodiment, the intensity modulation for the laser beam is conceived when the bar code information of the reflectance pattern as shown in FIG. 6A is recorded in the same manner as in the third embodiment. The optical disk manufactured in this embodiment is the LH disk. Therefore, the intensity modulation was performed for the laser beam as shown in FIG. 6C to record the bar code information. The entire surface of the recording layer of the optical disk is in the non-recorded state immediately before recording the information in the bar code area C. Therefore, in this embodiment, the area, which is irradiated with the high laser power (10 mW), is changed into the recorded state, and the reflectance of the corresponding portion is changed. Thus, the information is recorded.

In the case of the LH disk, as shown in FIG. 6C, the recorded state is given such that the laser beam having an intensity to effect the recording (10 mW in FIG. 6C) was radiated onto the portion intended to have a high reflectance (portion in the recorded state) as an area H shown in FIG. 6A, and the non-recorded state was maintained such that the laser beam having a weak intensity (0.5 mW in FIG. 6C) was radiated onto the portion intended to have a low reflectance (portion in the non-recorded state) as an area L shown in FIG. 6A. The bar code-shaped mark group, which corresponded to the reflectance pattern as shown in FIG. 6A, was also formed by modulating the laser beam intensity as described above on the LH disk in the same manner as on the HL disk.

As clarified from FIG. 6, when the optical disk is the LH disk as in this embodiment, the information having the same reflectance pattern (FIG. 6A) can be formed by changing the intensity modulation pattern for the laser beam (FIG. 6C) into the pattern reverse to the intensity modulation pattern for the laser beam (FIG. 6B) for the HL disk (third embodiment). When the information is reproduced from the bar code area in which the information is recorded in accordance with the method as described above, the information can be reproduced with the value within approximately the same reflectance range irrelevant to the type of the optical disk of the organic dye type (HL disk or LH disk). Therefore, when the information in the bar code area C is reproduced, it is unnecessary to adjust, for example, the gain depending on the type of the optical disk. It is possible to reproduce the information in the bar code area C quickly and highly reliably.

Fifth Embodiment

Recording and Reproducing Apparatus

Figure 5:
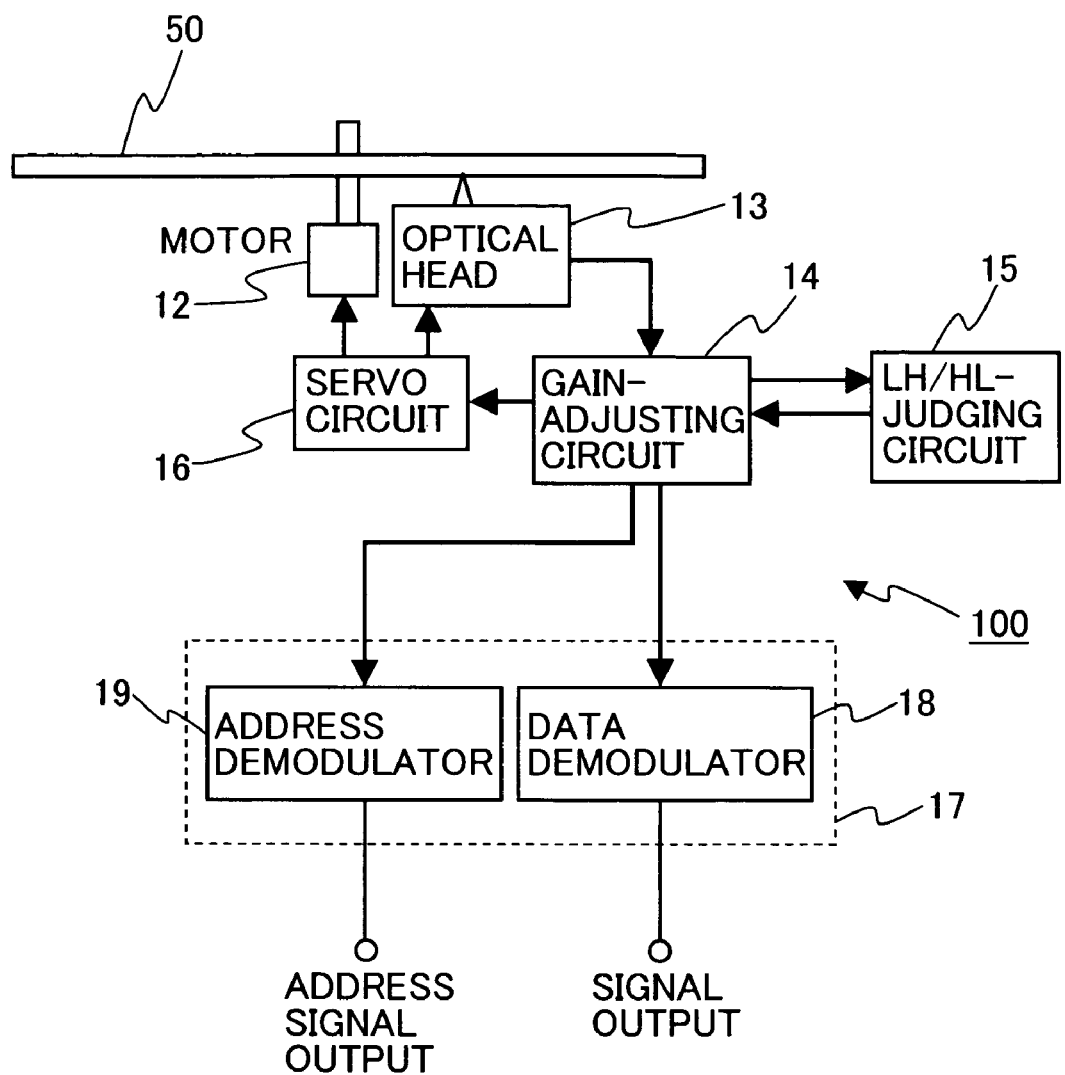
FIG. 5 shows a schematic arrangement of a recording and reproducing apparatus of the present invention.

FIG. 5 shows a recording and reproducing apparatus which is usable in order to record information and reproduce information on the optical disk manufactured in each of the first to fourth embodiments described above. As shown in FIG. 5, the recording and reproducing apparatus 100 of this embodiment principally includes a motor 12 which rotates the optical disk 50 manufactured in each of the first to fourth embodiments, an optical head 13 which radiates the laser beam onto the optical disk 50, a gain-adjusting circuit 14 which adjusts the amplification factor of the reproduced signal, a servo circuit 16 which controls the tracking, an LH/HL-judging circuit 15 which discriminates the type of the optical disk 50 (HL disk or LH disk), and a reproduced signal processing circuit 17 which reproduces information on the basis of the reproduced signal. As for the recording and reproducing apparatus 100 shown in FIG. 5, only the information-reproducing section is illustrated. The information-recording section, which is included in the recording and reproducing apparatus 500, is constructed in the same manner as that of the recording and reproducing apparatus for the conventional optical disk, which is omitted from FIG. 5.

As shown in FIG. 5, the reproduced signal processing circuit 17 principally includes a data demodularor 18 and an address demodularor 19. The data demodularor 18 reproduces the information on the basis of the reproduced signals of the bar code information, the control data, and the user data inputted from the optical head 13 via the gain-adjusting circuit 14. The result of the reproduction is outputted to a reproduced information-processing system (not shown). The address demodularor 19 reproduces the information on the basis of the reproduced signal of the address information inputted from the optical head 13 via the gain-adjusting circuit 14. The result of the reproduction is outputted to the reproduced information-processing system.

The optical head 13 includes a laser light source having a wavelength of 405 nm, and an objective lens having a numerical aperture of 0.65. When the laser beam is radiated from the optical head 13 onto the optical disk 50, the laser beam intensity was adjusted so that the intensity was 0.5 mW on the surface of the optical disk 50 for the laser beam collected on the surface of the optical disk 50. This embodiment adopts the ZCLV system as the method for controlling the rotation when the information is recorded and reproduced, in which the number of revolutions of the optical disk 50 is changed for every zone for performing the recording and reproduction.

The information is recorded and reproduced with the recording and reproducing apparatus 100 shown in FIG. 5 in accordance with the following procedure. At first, the optical disk 50 is installed to the recording and reproducing apparatus 100, and then the optical disk 50 is rotated at a predetermined number of revolutions by using the motor 12. Subsequently, the laser beam was radiated from the optical head 13 onto the bar code area C of the rotating optical disk 50 to reproduce the information from the bar code area C. In this procedure, the focus was adjusted so that the focus position of the laser beam is always disposed on the surface of the disk.

In this procedure, the information in the bar code area C is formed by the bar code-shaped mark group having the sufficient length (about 1 mm) in the radial directions. Therefore, the information can be reproduced with ease even without strictly controlling the position of the laser beam in the radial direction, i.e., even without strictly controlling the tracking. When the information to be recorded in the bar code area C is repeatedly recorded over one round, the reliability is further improved when the information is reproduced from the bar code area. As explained above about the method for forming the bar code area C, the bar code-shaped mark group is formed so that the range of the reflectance of the bar code-shaped mark group has the same value in the bar code area C of the optical disk 50 irrelevant to the type of the optical disk 50 (HL disk or LH disk). Therefore, when the information is reproduced from the bar code area C, the information can be reproduced quickly and highly reliably without adjusting the gain depending on the type of the optical disk 50.

Subsequently, the information to indicate whether the optical disk 50 is the HL disk or the LH disk, i.e., the information about the reflectance of the optical disk 50, which is included in the reproduced signal detected from the bar code area C, is inputted into the LH/HL-judging circuit 15 via the gain-adjusting circuit 14.

The LH/HL-judging circuit 15 judges whether the optical disk 50 is either the HL disk or the LH disk on the basis of the inputted information about the reflectance of the optical disk 50. Subsequently, the result of the judgment is fed to the gain-adjusting circuit 14. The gain-adjusting circuit 14 determines the optimum amplification factor of the reproduced signal inputted from the optical head 13 on the basis of the result of the judgment.

Subsequently, the optical head 13 was moved to the control data area B to reproduce the control data while performing the tracking control. The information, which related, for example, to the physical format of the disk (for example, the recording polarity and the reflectance) and the recording condition (for example, the recording linear velocity, the recording power, and the recording pulse width), was read from the pit array previously recorded in the control data area B to store the information in a recording control unit (not shown) in the recording and reproducing apparatus.

Subsequently, the optical head 13 was moved to the predetermined address area in the user data area A to record the data on the basis of the reproduced information about the control data area B.

The information recorded in the user data area A is reproduced in accordance with the following procedure. The optical head 13 was moved to the predetermined address area in the user data area A to radiate the laser beam, and the reflected light beam signal (reproduced signal) from the optical disk 50 was detected by using the optical head 13. The reproduced signal, which is detected by the optical head 13, is amplified with the optimum amplification factor by the gain-adjusting circuit 14, and the signal is fed to the data demodularor 18. The data demodularor 18 reproduced the user information from the amplified reproduced signal, and the signal was outputted to the reproduced information-processing system.

In the recording and reproducing apparatus described above, the optimum amplification factor for the reproduced signal can be determined on the basis of the information in relation to the type (HL disk or LH disk) of the optical disk recorded in the bar code area C, before reproducing the information from the control data area B and the user data area A. Therefore, when the information is reproduced from the control data area B and the user data area A, the reproduced signal having the optimum amplitude can be obtained without adjusting the gain depending on the type of the optical disk. Therefore, it is possible to reproduce the information recorded on the optical disk more quickly and highly reliably. Further, when the servo signal is detected for the tracking for the optical disk, the signal can be also detected with the optimum amplitude irrelevant to the type of the optical disk. Therefore, the information can be reproduced more highly reliably.

When the information was recorded and reproduced while installing the optical disk manufactured in each of the first to fourth embodiments to the recording and reproducing apparatus as described above, the user information was successfully reproduced highly reliably without adjusting the gain irrelevant to whether the optical disk of the phase-change recording type or the organic dye type was either the HL disk or the LH disk.

As shown in FIG. 3, in the first and second embodiments described above, the laser beam having the weak intensity (150 mW) was radiated onto the area to be maintained in the amorphous state when the bar code-shaped mark group was formed in the bar code area C of the optical disk. However, the present invention is not limited thereto. It is also allowable that the laser beam is not radiated onto the area to be maintained in the amorphous state.

In the first to fourth embodiments, the information was recorded in the bar code area C shown in FIG. 1 over one round of the optical disk. However, the present invention is not limited thereto. It is also allowable that the bar code-shaped mark group is formed in a part of the bar code area C. Alternatively, it is also allowable that a set of information to be recorded (for example, the identification information about the optical disk and the information about the reflectance of the optical disk) is repeatedly recorded in the bar code area C. When the information is recorded repeatedly in the bar code area C, the reliability is further improved for the information in the bar code area C.

According to the optical disk of the present invention, the information about the reflectance of the optical disk is recorded in the bar code area. Therefore, the information is easily obtained without strictly performing the tracking control and the gain adjustment. As a result, it is possible to optimally adjust the gain for the reproduced signal quickly. Therefore, the optical disk of the present invention is preferred as the optical disk which makes it possible to reproduce the information in the control data area and the user data area and the servo signal for the tracking quickly and highly reliably irrelevant to the type of the optical disk (HL disk or LH disk).

According to the recording and reproducing apparatus and the reproducing method of the present invention, the information about the reflectance of the optical disk, which is recorded in the bar code area of the optical disk, is detected without strictly performing the tracking control and the gain adjustment, and the type of the optical disk (HL disk or LH disk) is discriminated on the basis of the information to determine the optimum amplification factor of the reproduced signal. Therefore, the recording and reproducing apparatus and the reproducing method of the present invention are preferred as the recording and reproducing apparatus and the reproducing method which are usable to reproduce the information in the control data area and the user data area and the servo signal for the tracking quickly and highly reliably irrelevant to the type of the optical disk (HL disk or LH disk).

According to the method for producing the optical disk of the present invention, when the bar code-shaped marks are formed in the recording layer formed of the phase-change material, the information of the same reflectance pattern can be formed on both of the HL disk and the LH disk by reversing the intensity modulation pattern for the light beam as shown in FIG. 3 depending on the type of the optical disk. Further, when the bar code-shaped marks are formed in the recording layer formed of the organic dye material, the information of the same reflectance pattern can be formed on both of the HL disk and the LH disk by reversing the intensity modulation pattern for the light beam as shown in FIG. 6 depending on the type of the optical disk. As a result, in the case of the optical disk manufactured in accordance with the production method of the present invention, the reproduction can be performed with the value of the same reflectance range irrelevant to the type of the optical disk (HL disk or LH disk) when the information is reproduced from the bar code area. Therefore, the production method of the present invention is preferred as the production method which is usable to produce the optical disk capable of reproducing the information from the bar code area quickly and highly reliably without performing, for example, the gain adjustment depending on the type of the optical disk.

What is claimed is:

1. An optical disk comprising:
   a first area on which user information is recorded; and
   a second area in which a plurality of marks radially extending are arranged in a track direction in the optical disk,
   wherein information about a reflectance of the optical disk is recorded in the second area;
   a concentric or a spiral guide groove is formed in the first area, and address information is recorded by deflecting the guide groove in the radial direction of the optical disk; and
   the user information is recorded on at least one of the guide groove and an area between the guide grooves, and the following relationship holds among a track pitch TP of the first area, a wavelength $\lambda$ of a light beam to be used for recording and reproducing information, and a numerical aperture NA of a light-collecting lens:

$$0.35 \times (\lambda/NA) \leq TP \leq 0.7 \times (\lambda/NA).$$

2. The optical disk according to claim 1, wherein the information about the reflectance of the optical disk is information about the reflectance of the optical disk is information which indicates a relationship between a reflectance in a non-recorded state and a reflectance in the recorded state in the first area.

3. The optical disk according to claim 1, wherein the user information is recorded on the guide groove and the area between the guide grooves respectively.

4. The optical disk according to claim 1, wherein the optical disk comprises a recording layer which is formed of a phase-change material containing Bi, Ge, and Te, and the recording layer is provided in the first area and the second area.

5. The optical disk according to claim 1, wherein the optical disk comprises a recording layer containing an organic dye, and the recording layer is provided in the first area and the second area.

6. An optical disk comprising:
   a first area on which user information is recorded; and
   a second area in which a plurality of marks radially extending are arranged in a track direction in the optical disk,
   wherein the information about a reflectance of the optical disk is recorded in the second area;
   a concentric or a spiral guide groove is formed in the first area, and address information is recorded by deflecting the guide groove in the radial direction of the optical disk;
   the user information is recorded on at least one of the guide groove and an area between the guide grooves, and the following relationship holds among a track pitch TP of the first area, a wavelength $\lambda$ of a light beam to be used for recording and reproducing information, and a numerical aperture NA of a light-collecting lens:

$$0.35 \times (\lambda/NA) \leq TP \leq 0.7 \times (\lambda/NA);$$

and
   the information about the reflectance of the optical disk is information which indicates whether the optical disk is a HL disk or a LH disk.

* * * * *